(12) United States Patent
Wang et al.

(10) Patent No.: US 12,409,561 B2
(45) Date of Patent: Sep. 9, 2025

(54) MULTIFUNCTIONAL CONSTRUCTION SITE CLEANING ROBOT AND CLEANING METHOD USING SAME

(71) Applicant: WUHAN CONSTRUCTION ENGINEERING GROUP CO., LTD., Wuhan (CN)

(72) Inventors: Shuai Wang, Wuhan (CN); Aixun Wang, Wuhan (CN); Xiaolong Yang, Wuhan (CN); Wenxiang Li, Wuhan (CN); Tong Lu, Wuhan (CN); Tingting Zhang, Wuhan (CN); Ming You, Wuhan (CN); Jianhui Wu, Wuhan (CN); Bo Wang, Wuhan (CN); Bangfeng Xi, Wuhan (CN); Li Wang, Wuhan (CN)

(73) Assignee: WUHAN CONSTRUCTION ENGINEERING GROUP CO., LTD., Wuhan (CN)

( * ) Notice: Subject to any disclaimer, the term of this patent is extended or adjusted under 35 U.S.C. 154(b) by 0 days.

(21) Appl. No.: 18/995,186

(22) PCT Filed: Jun. 29, 2023

(86) PCT No.: PCT/CN2023/103894
§ 371 (c)(1),
(2) Date: Jan. 16, 2025

(87) PCT Pub. No.: WO2024/060766
PCT Pub. Date: Mar. 28, 2024

(65) Prior Publication Data
US 2025/0256405 A1    Aug. 14, 2025

(30) Foreign Application Priority Data

Sep. 20, 2022 (CN) .......................... 202211144114.4

(51) Int. Cl.
*B25J 11/00* (2006.01)
*A47L 11/24* (2006.01)
(Continued)

(52) U.S. Cl.
CPC ........... *B25J 11/0085* (2013.01); *A47L 11/24* (2013.01); *B01D 47/06* (2013.01); *B08B 5/04* (2013.01);
(Continued)

(58) Field of Classification Search
CPC ........ A47L 11/24; A47L 2201/00; E01H 1/00; E01H 1/0827; B01D 47/06; B65F 1/1405; B08B 5/04
See application file for complete search history.

(56) References Cited

U.S. PATENT DOCUMENTS

2007/0220849 A1   9/2007 Ryan
2017/0364091 A1*  12/2017 Bennett ................. A47L 9/2857
2019/0218732 A1   7/2019 Teixeira Goethel

FOREIGN PATENT DOCUMENTS

CA          2176315 A1   11/1996
CN        205171433 U     4/2016
(Continued)

*Primary Examiner* — Bryan R Muller
(74) *Attorney, Agent, or Firm* — Bayramoglu Law Offices LLC

(57) ABSTRACT

A multifunctional construction site cleaning robot and a cleaning method using the same are provided. The robot includes a chassis part; a bottom rotatable function part, including a sweeper unit, an iron remover unit, a leaf remover unit and a cutter unit; a debris treatment part, including a compression unit, a debris container and a pulverizing unit; a container exchange part, including a movable gripper unit and openable containers, the openable containers being configured to contain sundries collected by the sweeper unit and the iron remover unit; a spray part, configured to prewet or dedust a construction site; and a (Continued)

water transfer part, including an extensible water discharging unit and an extensible water pumping unit, the extensible water discharging unit being configured to pump accumulated water, and the extensible water pumping unit being configured to pump accumulated water from a bottom of a pit to the ground.

9 Claims, 19 Drawing Sheets

(51) Int. Cl.
*B01D 47/06* (2006.01)
*B08B 5/04* (2006.01)
*B25J 5/00* (2006.01)
*B25J 9/00* (2006.01)
*B65F 1/14* (2006.01)
*E01H 1/08* (2006.01)

(52) U.S. Cl.
CPC ............ *B25J 5/007* (2013.01); *B25J 9/0009* (2013.01); *B65F 1/1405* (2013.01); *E01H 1/0827* (2013.01); *E01H 1/0836* (2013.01); *A47L 2201/00* (2013.01)

(56) References Cited

FOREIGN PATENT DOCUMENTS

| | | | | |
|---|---|---|---|---|
| CN | 107604862 | A * | 1/2018 | ............... E01H 1/00 |
| CN | 107858971 | A | 3/2018 | |
| CN | 107988974 | A | 5/2018 | |
| CN | 207452791 | U | 6/2018 | |
| CN | 108755538 | A | 11/2018 | |
| CN | 110093887 | A | 8/2019 | |
| CN | 111119102 | A | 5/2020 | |
| CN | 214271859 | U | 9/2021 | |
| CN | 215128064 | U | 12/2021 | |
| CN | 215314163 | U | 12/2021 | |
| CN | 113897893 | A | 1/2022 | |
| CN | 216679203 | U | 6/2022 | |
| CN | 216786973 | U | 6/2022 | |
| CN | 216948023 | U | 7/2022 | |
| CN | 115009734 | A | 9/2022 | |
| CN | 115478507 | A | 12/2022 | |
| EP | 3889358 | A1 | 10/2021 | |
| GB | 1351866 | A | 5/1974 | |
| JP | 2009219846 | A | 10/2009 | |
| WO | 2021184860 | A1 | 9/2021 | |

* cited by examiner

MULTIFUNCTIONAL CONSTRUCTION SITE CLEANING ROBOT AND CLEANING METHOD USING SAME

CROSS REFERENCE TO THE RELATED APPLICATIONS

This application is the national phase entry of International Application No. PCT/CN2023/103894, filed on Jun. 29, 2023, which is based upon and claims priority to Chinese Patent Application No. 202211144114.4, filed on Sep. 20, 2022, the entire contents of which are incorporated herein by reference.

TECHNICAL FIELD

The disclosure relates to the technical field of construction engineering, and in particular to a multifunctional construction site cleaning robot and a cleaning method using the multifunctional construction site cleaning robot.

BACKGROUND

During building construction, the process of the construction site is complicated, and various building debris and sundries are distributed on the site. If not cleaned in time, the building debris and sundries will affect the appearance and bring hidden dangers to the subsequent construction. Manual cleaning is time-consuming, labor-intensive, inefficient and ineffective, affecting the construction progress. Using mechanical devices instead of manual cleaning can improve cleaning efficiency.

Patent No. CN202010003548.7 discloses a construction site ground cleaning robot. A reciprocating moving rod drives a connecting rod to reciprocate, and a shovel plate moves accordingly to constantly shovel hard objects on the ground so as to remove slurry agglomerates on the ground. However, this cleaning robot only has a single function module, and cannot meet the needs of the construction site. On the construction site, in addition to building debris, there are also slurry agglomerates, weeds/shrubs, fallen leaves, accumulated water and flying dust that need to be removed, as well as small iron pieces and iron nails that need to be recycled. Moreover, the debris also needs to be classified. Therefore, it is necessary to design a multifunctional construction site cleaning robot, which not only can clean away the building debris, but also has the functions of collecting slurry agglomerates, recycling small iron pieces and iron nails, removing fallen leaves, cutting weeds and shrubs, treating accumulated water, suppressing dust and classifying the debris.

SUMMARY

In view of the defects in the prior art, a technical problem to be solved by the disclosure is to provide a multifunctional construction site cleaning robot, which can remove building debris, slurry agglomerates and dust, recycle iron pieces, cut weeds/shrubs, remove fallen leaves, classify debris and remove accumulated water.

The disclosure further provides a cleaning method using the multifunctional construction site cleaning robot, which uses different means for removing accumulated water, removing slurry agglomerates, removing fallen leaves, suppressing dust and recycling iron pieces. These means are used in combination so as to effectively improve utilization and construction efficiency of the cleaning robot.

In order to achieve the above objective, the disclosure adopts the following technical measures:

The multifunctional construction site cleaning robot of the disclosure includes: a chassis part, including a multi-openable-door support plate unit and three-wheel units mounted at four corners of the multi-openable-door support plate unit, and configured to drive the whole robot to move on ground and climb stairs; a bottom rotatable function part, mounted at a middle position of a bottom of the multi-openable-door support plate unit, and including a rotatable cross bracket unit, and a sweeper unit, an iron remover unit, a leaf remover unit and a cutter unit that are detachably mounted on the rotatable cross bracket unit, the cutter unit and the sweeper unit being used in combination for cleaning away cement agglomerates or weeds/shrubs, a target object being cut by the cutter unit and then removed by the sweeper unit, the iron remover unit being configured to remove recyclable iron pieces on a construction site, and the leaf remover unit being configured to remove light and small debris on the construction site; a debris treatment part, mounted on one side of the multi-openable-door support plate unit and connected to the leaf remover unit, and including a compression unit, a debris container and a pulverizing unit, the pulverizing unit and the compression unit being used in combination for pulverizing and compacting the debris in the debris container; a container exchange part, mounted on the multi-openable-door support plate unit and including a movable gripper unit and openable containers, the movable gripper unit exchanging positions of the two openable containers, and the openable containers being configured to contain sundries collected by the sweeper unit and the iron remover unit; a spray part, mounted on the other side of the multi-openable-door support plate unit and configured to prewet or dedust the construction site; and a water transfer part, mounted on an edge of the multi-openable-door support plate unit close to the spray part and including an extensible water discharging unit and an extensible water pumping unit, the extensible water discharging unit being configured to pump accumulated water from an inside to an outside of a building, and the extensible water pumping unit being configured to pump accumulated water from a bottom of a pit to the ground.

Preferably, the multi-openable-door support plate unit includes first gear slots, first gear motors, a first openable door, first steel angles, second openable doors, second gear slots, second gear motors, second steel angles, a steel plate, a circular slot and perforated steel plates. The two first steel angles are welded on two sides of a water tank slot of the steel plate, the first openable door is movable along grooves of the first steel angles, the two first gear motors are fixed to two slots of the first openable door, and a gear output shaft of the first gear motor meshes with the first gear slot. The four second steel angles are fixed on two sides of container slots, the second openable door is movable along grooves of the second steel angles, the second gear motor is fixed to the second openable door, a gear output shaft of the second gear motor meshes with the second gear slot, and the four perforated steel plates are respectively fixed to four corners of the steel plate. The three-wheel units each include mecanum wheels, three-wheel unit first motors, a three-shaft link and a three-wheel unit second motor, the three three-wheel unit first motors are fixed to three corners of the three-shaft link, the three mecanum wheels are respectively connected to output shafts of the three-wheel unit first motors, the three-wheel unit second motor is fixed to the perforated steel plate, and an output shaft of the three-wheel unit second motor is connected to a center of the three-shaft link. When the cleaning robot travels on a flat surface, two of the mecanum wheels are on the ground, and by controlling speeds of the three-wheel unit first motors of the two mecanum wheels on the ground, the cleaning robot is capable of moving back and forth, moving laterally, moving diagonally and rotating in situ.

Further, the sweeper unit includes a broom mechanism and a dustpan mechanism, and the dustpan mechanism sequentially includes a sweeper replaceable support plate, a sweeper first u-shaped steel, sweeper first steering engines, sweeper first linear actuators, a dustpan and a sweeper first motor from top to bottom. The broom mechanism sequentially includes a sweeper second u-shaped steel, sweeper second steering engines, sweeper second linear actuators, a roller broom and a sweeper second motor from top to bottom. The roller broom is a special-shaped piece formed by a roller and four iron sheets uniformly distributed on a circumferential surface of the roller. The sweeper replaceable support plate is fixed to a cross iron bracket of the rotatable cross bracket unit through nuts, the sweeper first u-shaped steel is welded to the sweeper replaceable support plate, the sweeper first steering engines are fixed to the sweeper first u-shaped steel, the sweeper first linear actuator is connected to an output shaft of the sweeper first steering engine, and an output shaft of the sweeper first motor runs through an output shaft of the sweeper first linear actuator and is connected to the dustpan. The sweeper second u-shaped steel is fixed to the sweeper replaceable support plate, the sweeper second steering engines are fixed to the sweeper second u-shaped steel, the sweeper second linear actuator is connected to an output shaft of the sweeper second steering engine, and an output shaft of the sweeper second motor runs through an output shaft of the sweeper second linear actuator and is connected to the roller broom.

Further, the iron remover unit sequentially includes an iron remover replaceable support plate, an iron remover u-shaped steel, iron remover steering engines, iron remover linear actuators, an iron remover motor and an electromagnetic roller from top to bottom, the iron remover replaceable support plate is fixed to the cross iron bracket through nuts, the iron remover u-shaped steel is fixed to the iron remover replaceable support plate, the iron remover steering engines are fixed to the iron remover u-shaped steel, the iron remover linear actuator is connected to an output shaft of the iron remover steering engine, and an output shaft of the iron remover motor runs through an output shaft of the iron remover linear actuator and is connected to the electromagnetic roller. Before use, the iron remover linear actuators are started to adjust a height of the electromagnetic roller, the electromagnetic roller is powered on, and the iron remover motor is started to control the electromagnetic roller to rotate so as to facilitate uniform attachment of the iron pieces; when the iron pieces attached to the electromagnetic roller reach a certain weight, the iron remover steering engines are started to control the electromagnetic roller to move to the aluminum box slot in the openable container; and when the electromagnetic roller is completely extended into the slot, the electromagnetic roller is powered off to remove magnetic properties, and the iron pieces naturally fall into the container.

Preferably, the leaf remover unit sequentially includes a leaf remover replaceable support plate, a leaf remover first linear actuator, a leaf remover u-shaped steel, a conduit, leaf remover second linear actuators, a round rod and a suction nozzle from top to bottom. The leaf remover replaceable support plate is fixed to the cross iron bracket through nuts, the leaf remover u-shaped steel and the leaf remover first linear actuator are fixed to the leaf remover replaceable support plate, leaf remover steering engines are fixed to the leaf remover u-shaped steel, the leaf remover second linear actuator is connected to an output shaft of the leaf remover steering engine, and output shafts of the leaf remover second linear actuators are connected to the suction nozzle through the round rod. An inlet at a lower end of the conduit is connected to the suction nozzle, an upper end of the conduit is fixed to an output shaft of the leaf remover first linear actuator, and an outlet of the conduit is connected to a fan of the debris container. Before use, a turntable motor is rotated such that the leaf remover unit faces the debris container, the leaf remover first linear actuator is extended and retracted to control the conduit to be inserted into the fan in the debris container, the fan is started, and the whole cleaning robot is moved to remove the light and small debris on the construction site.

Further, the cutter unit sequentially includes a cutter, a cutter first steering engine, a cutter first link, a cutter second steering engine, a cutter second link, a cutter third steering engine, a steering engine turntable, a cutter fourth steering engine, a steering engine fixing plate and a cutter replaceable support plate from top to bottom. The cutter replaceable support plate is fixed to the cross iron bracket through nuts, the steering engine fixing plate fixes the cutter fourth steering engine to the cutter replaceable support plate, the steering engine turntable is connected to an output shaft of the cutter fourth steering engine, the cutter third steering engine is fixed to the steering engine turntable, one end of the cutter second link is connected to an output shaft of the cutter third steering engine, the other end is connected to the cutter second steering engine, the cutter second steering engine and the cutter first steering engine are respectively fixed to two ends of the cutter first link, and the cutter is connected to an output shaft of the cutter first steering engine. The cutter second steering engine and the cutter third steering engine adjust a height of the cutter by adjusting angles of the cutter first link and the cutter second link, the cutter fourth steering engine is capable of controlling the cutter to cut left and right, and the cutter first steering engine is capable of controlling a cutting direction of the cutter.

Preferably, the compression unit includes traveling mechanisms on two sides and a compression mechanism located in a middle of the two traveling mechanisms, and the traveling mechanism sequentially includes a compression unit u-shaped strut, a compression unit motor, a first perforated caster, a compression unit linear actuator and a second perforated caster from top to bottom. The compression mechanism sequentially includes a compression unit first round rod, a compression unit oil cylinder, a compression unit second round rod, compression unit first links and a circular plate from top to bottom. An output shaft of the compression unit motor runs through the compression unit u-shaped strut and is connected to the first perforated caster, the compression unit linear actuator is fixed to a side surface of the compression unit u-shaped strut, the compression unit first round rod is fixed in a middle of the two compression unit u-shaped struts, a cylinder body of the compression unit oil cylinder is fixed to the compression unit first round rod, a cylinder plunger is connected to the compression unit second round rod, and two ends of the compression unit second round rod are connected to the circular plate through the two compression unit first links. Before the compression mechanism is in use, the compression unit motors are started to control the compression unit to move until the circular plate is coaxial with a drum of the debris container, the compression unit motors are turned off, the compression unit linear actuators are started such that output shafts of the compression unit linear actuators are extended into small holes of the second perforated casters to prevent the compression unit from slipping during use of the compression mechanism, and the compression unit oil cylinder is started to control the circular plate to apply a pressure to the debris in the debris container, so as to compress the debris, thus reducing space. The debris container includes the drum, a circular hinged door, debris container links, a bidirectional linear actuator and the fan, the fan is connected to a slot on a side surface of the drum, two ends of a middle rod in the circular hinged door are fixed to a bottom of the drum, and the bidirectional linear actuator is fixed to the circular hinged door through the two debris container links. The fan is configured to provide suction for the leaf remover unit, and the bidirectional linear actuator is capable of opening the circular hinged door by retracting an output shaft so as to facilitate dumping of the debris in the debris container. The pulverizing unit includes traveling mechanisms on two sides and a pulverizing mechanism located in a middle of the two traveling mechanisms, and the traveling mechanism has same composition and functions as the traveling mechanism in the compression unit. The pulverizing mechanism sequentially includes a pulverizing unit link, a pulverizing unit oil cylinder, a pulverizing unit motor and a blade holder from top to bottom. Two ends of the pulverizing unit link are fixed to the pulverizing unit u-shaped struts on the two sides, a cylinder body of the pulverizing unit oil cylinder is connected to the pulverizing unit link, a cylinder plunger is connected to the pulverizing unit motor, and the blade holder is fixed to an output shaft of the pulverizing unit motor. The pulverizing unit has a same moving manner and a same anti-slip manner as those of the compression unit, and after the blade holder is aligned with the drum, the pulverizing unit motor is started to make blades on the blade holder rotate, and the pulverizing unit oil cylinder is started such that the blade holder is extended into the drum to pulverize the debris.

Further, the movable gripper unit includes traveling devices on two sides and a gripper mechanism located in a middle of the two traveling devices. The traveling device sequentially includes a second steel channel, a gripper unit u-shaped strut, a gripper unit oil cylinder and a gripper first support plate from bottom to top. The gripper mechanism sequentially includes gripper second support plates, a gripper third support plate, gripper first links, gripper second links and joints from top to bottom. A cylinder body of the gripper unit oil cylinder is fixed to the gripper unit u-shaped strut, a cylinder plunger is connected to the gripper first support plate, the two gripper second support plates are fixed to the gripper first support plate, the gripper third support plate is fixed to the gripper second support plates so as to support a gripper oil cylinder, and the gripper oil cylinder is fixed to the gripper third support plate. One end of the gripper first link is connected to the gripper second support plate, and the other end is connected to the joint. One end of the gripper second link is connected to a cylinder plunger of the gripper oil cylinder, and the other end is connected to the joint.

Preferably, the extensible water discharging unit sequentially includes a water discharging unit water inlet, a first water tube storage rack, a second water tube, a water discharging unit motor, a roller wheel, a roller wheel holder and a water discharging unit water outlet from top to bottom. The second water tube is retractable or extensible along the first water tube storage rack, an output shaft of the water discharging unit motor is connected to the first water tube storage rack to control a roller of the first water tube storage rack to rotate, the roller wheel holder is welded to the steel plate and configured to support the roller wheel, and the water discharging unit water outlet is arranged on the roller wheel to facilitate extension and retraction of the second water tube. Before pumping water, the cleaning robot is moved to a vicinity of an outdoor drainage ditch, the water discharging unit motor is started such that the water discharging unit water outlet is lowered to a side of the drainage ditch, and the second water tube is extended while moving the robot to a side of the accumulated water in the construction site, thereby completing extension of the extensible water discharging unit. The extensible water pumping unit sequentially includes a water pumping unit motor, a second water tube storage rack, a third water tube, a water pumping unit water outlet, a water pumping unit water inlet and a water pumping unit water pump from top to bottom. The second water tube storage rack in the extensible water pumping unit has a same composition and a same water tube extension manner as those of the extensible water discharging unit, and the water pumping unit water pump, which is connected to the water pumping unit water inlet, is added to the extensible water pumping unit based on the extensible water discharging unit. Before pumping water, the third water tube is extended in a same manner as the extensible water discharging unit until the water pumping unit water pump is extended into a bottom of the accumulated water, and the water pumping unit water pump is started to pump water.

Correspondingly, the disclosure further provides a cleaning method using the multifunctional construction site cleaning robot, including the following steps:

S1: before cleaning away accumulated water, moving the cleaning robot to a vicinity of an outdoor drainage ditch, starting a water discharging unit motor such that a water discharging unit water outlet is lowered to a side of the drainage ditch, and extending the second water tube while moving the robot to a side of the accumulated water in a construction site, thereby completing extension of an extensible water discharging unit; and starting a water pumping unit motor such that a water pumping unit water inlet is lowered to a bottom of a water pit, and starting a water pumping unit water pump, thereby removing the accumulated water;

S2: before cleaning away weeds/shrubs or slurry agglomerates, moving the robot to above a target object, starting a cutter unit to cut the target object; when the robot continues moving forward, moving the sweeper unit to a position where a cutter is originally located, and controlling the sweeper unit to sweep away debris; and after the dustpan is full of the debris, dumping the debris into an openable container;

S3: before cleaning away fallen leaves or other light and small debris, replacing all four function units of a bottom rotatable function part with leaf remover units to cooperate with mecanum wheels capable of moving back and forth, moving laterally and moving diagonally, such that the robot is capable of removing the fallen leaves or dust in a large area no matter which direction it goes, where when the robot moves diagonally, the bottom rotatable function part is rotated by 45°, during cleaning, a pulverizing mechanism and a compression mechanism on the robot are capable of pulverizing and compressing the fallen leaves in a debris container so as to reduce space, and after the cleaning is completed, a hinged door at a bottom of the debris container is opened to dump the debris; and S4: before cleaning away garbage on stairs, starting a three-wheel unit second motor such that a whole three-wheel unit rotates to increase a radius of rotation, where during the rotation, when a first mecanum wheel contacts a first step, the first mecanum wheel supports the whole robot to move forward such that a second mecanum wheel contacts a second step, and the process is repeated such that the robot is capable of climbing the stairs; and during stair climbing, the slurry agglomerates are cut by the cutter unit and then swept away by the sweeper unit, and finally, a spray part is used to suppress dust.

Thereby, the multifunctional construction site cleaning robot and the cleaning method using the same according to the disclosure have the following beneficial effects:

1. The existing construction site cleaning robot typically only has the functions of removing slurry agglomerates and suppressing dust, and cannot recycle iron pieces, cut weeds/shrubs, remove fallen leaves, classify debris and remove accumulated water. According to the disclosure, the bottom of the cleaning robot is provided with the cutter unit, the leaf remover unit and the iron remover unit which are respectively used for cutting slurry agglomerates and weeds/shrubs and removing fallen leaves. The extensible water pumping unit and the extensible water discharging unit can transfer the accumulated water in the construction site to the external drainage ditch. The storage boxes are provided respectively for recycling iron pieces and storing fallen leaves and slurry agglomerates. The disclosure integrates a variety of function modules, which helps in forming a comprehensive construction site ground cleaning system, enhancing the cleaning rate and environmental quality of the construction site and improving the construction efficiency.

2. In the existing construction site cleaning robot, the cleaning mechanism and the debris storage mechanism are typically arranged in a same plane, which makes the robot large in size and unable to enter some buildings. Moreover, the debris storage box is not provided with pulverizing and compression mechanisms, which wastes the storage space and reduces the cleaning efficiency. In the disclosure, the rotatable function part and the debris container are arranged at the bottom of the robot, and the openable containers, the pulverizing mechanism, the compression mechanism, the gripper mechanism and the water transfer part are arranged at the top of the robot, which is beneficial to reducing space of the robot. Moreover, the pulverizing mechanism and the compression mechanism are arranged outside the debris container and are movable, which avoids the inconvenience of transporting debris in two containers respectively provided for the pulverizing mechanism and the compression mechanism. In the disclosure, the debris container is fixed, and the pulverizing mechanism and the compression mechanism move in turn to treat the debris in the debris container, which is beneficial to improving the efficiency and reduces space of the robot.

3. The existing construction site cleaning robot typically can only clean the ground, but there are also a variety of debris to be cleaned on the stairs of the building. In the disclosure, by using three-link mecanum wheel structures, the robot cannot only travel quickly in multiple directions on the ground, but also climb stairs while doing the cleaning. Before cleaning away garbage on stairs, the three-wheel unit second motor is started such that the whole three-wheel unit rotates to increase a radius of rotation. During the rotation, when the first mecanum wheel contacts the first step, the first mecanum wheel supports the robot to move forward such that the second mecanum wheel contacts the second step, and the process is repeated such that the robot is capable of climbing the stairs. During stair climbing, the slurry agglomerates are cut by the cutter unit and then swept away by the sweeper unit, and finally, the spray part is used to suppress dust.

4. In the existing cleaning robot, it is impossible to flexibly change the proportion of function units according to actual situations. For example, when some function modules are not usable in this scene, it is equivalent to occupying idle positions in the robot. In the disclosure, the cutter unit, the leaf remover unit, the iron remover unit and the sweeper unit in the bottom rotatable function part are fixed to the cross iron bracket through nuts, and their proportion can be changed according to actual situations. For example, when it is only required to remove iron pieces, all the four function units may be iron remover units. In this way, the robot can collect iron pieces in the largest area no matter it moves laterally or diagonally, and the carrying capacity for iron pieces is greatly improved, which is beneficial to improving the working efficiency. The installation, use and efficacy of the other three function units are the same as above.

BRIEF DESCRIPTION OF THE DRAWINGS

The accompanying drawings described herein are intended to provide a further understanding of this application and constitute a part of this application, and exemplary examples and descriptions of this application are used to explain this application and do not constitute an improper limitation to this application.

DESCRIPTION OF REFERENCE SIGNS

Figure 1:
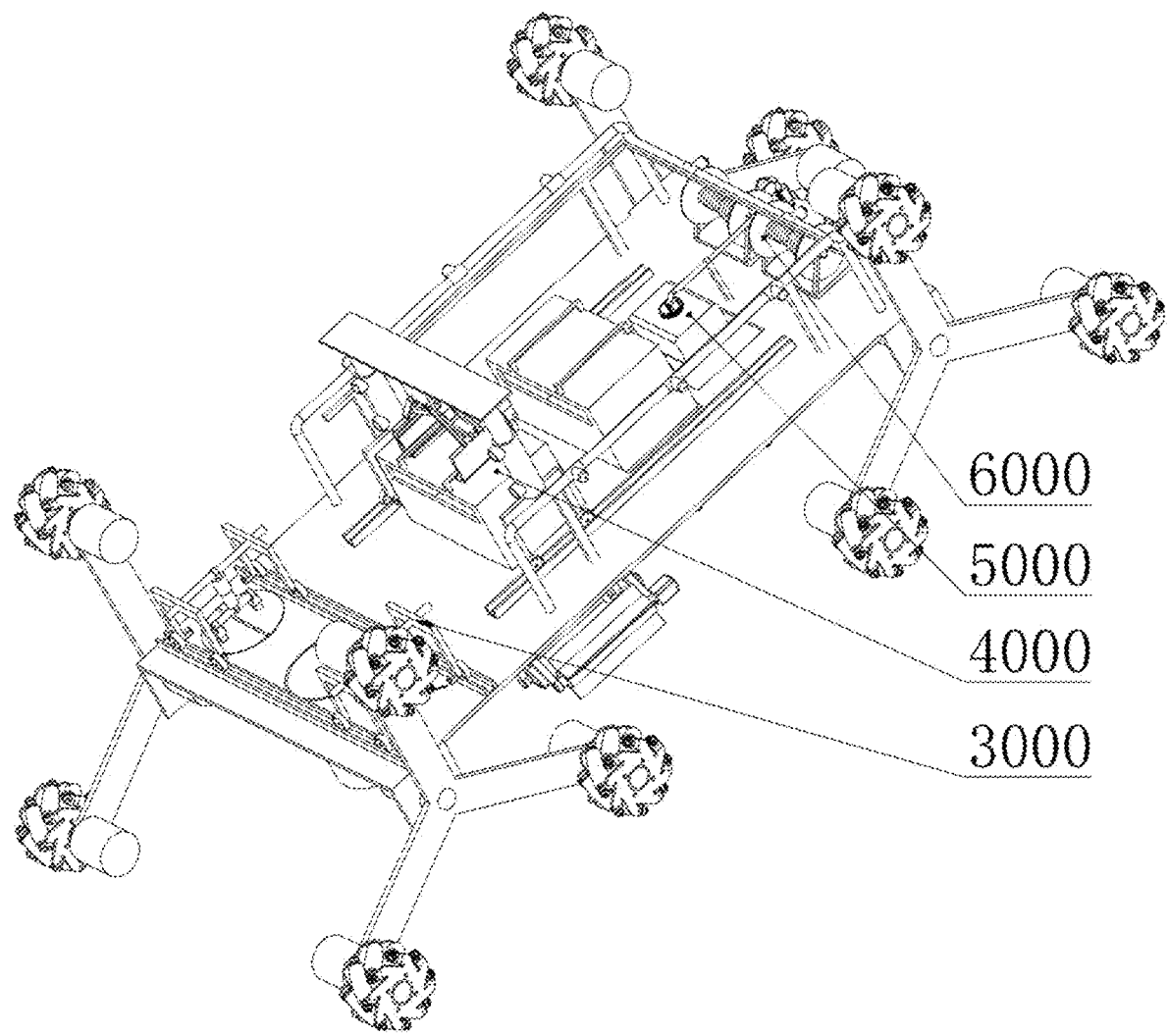
FIG. 1 is a schematic overall structural view of a multifunctional construction site cleaning robot according to the disclosure.

1000—bottom rotatable function part:
1100—sweeper unit; 1101—sweeper replaceable support plate; 1102—sweeper first u-shaped steel; 1103—sweeper first steering engine; 1104—sweeper first linear actuator; 1105—dustpan; 1106—sweeper first motor; 1107—sweeper second u-shaped steel; 1108—sweeper second steering engine; 1109—sweeper second linear actuator; 1110—roller broom; 1111—sweeper second steering engine;
1200—iron remover unit; 1201—iron remover replaceable support plate; 1202—iron remover u-shaped steel; 1203—iron remover steering engine; 1204—iron remover linear actuator; 1205—iron remover motor; 1206—electromagnetic roller;
1300—rotatable cross bracket unit; 1301—turntable motor; 1302—cross iron bracket;
1400—leaf remover unit; 1401—leaf remover replaceable support plate; 1402—leaf remover first linear actuator; 1403—leaf remover u-shaped steel; 1404—leaf remover steering engine; 1405—conduit; 1406—leaf remover second linear actuator; 1407—round rod; 1408—suction nozzle;
1500—cutter unit; 1501—cutter; 1502—cutter first steering engine; 1503—cutter first link; 1504—cutter second steering engine; 1505—cutter second link; 1506—cutter third steering engine; 1507—steering engine turntable; 1508—cutter fourth steering engine; 1509—steering engine fixing plate; 1510—cutter replaceable support plate;
2000—chassis part:
2100—three-wheel unit; 2101—mecanum wheel; 2102—three-wheel unit first motor; 2103—three-shaft link; 2104—three-wheel unit second motor;
2200—multi-openable-door support plate unit; 2201—first gear slot; 2202—first gear motor; 2203—first openable door; 2204—first steel angle; 2205—second openable door; 2206—second gear slot; 2207—second gear motor; 2208—second steel angle; 2209—steel plate; 2210—circular slot; 2211—perforated steel plate;
3000—debris treatment part:
3100—compression unit; 3101—compression unit u-shaped strut; 3102—compression unit motor; 3103—first perforated caster; 3104—compression unit linear actuator; 3105—second perforated caster; 3106—compression unit first round rod; 3107—compression unit oil cylinder; 3108—compression unit second round rod; 3109—compression unit first link; 3110—circular plate;
3200—first steel channel;
3300—debris container; 3301—drum; 3302—circular hinged door; 3303—debris container link; 3304—bi-directional linear actuator;
3305—fan;
3400—pulverizing unit; 3401—pulverizing unit u-shaped strut; 3402—pulverizing unit link; 3403—pulverizing unit oil cylinder; 3404—pulverizing unit motor; 3405—blade holder; 4000—container exchange part:
4100—movable gripper unit; 4101—second steel channel; 4102—gripper unit u-shaped strut; 4103—gripper unit oil cylinder; 4104—gripper first support plate; 4105—gripper second support plate; 4106—gripper third support plate; 4107—gripper first link; 4108—gripper second link; 4109—joint;
4200—openable container; 4201—aluminum box; 4202—aluminum box slot; 4203—aluminum box handle; 4204—aluminum box gear slot; 4205—aluminum box gear motor; 4206—aluminum box baffle; 4207—aluminum box steel angle;
5000—spray part:
5001—first water tube; 5002—water tube holder; 5003—nozzle; 5004—water pump holder; 5005—water supply duct; 5006—spray part water pump; 5007—water tank;
6000—water transfer part:
6100—extensible water discharging unit; 6101—water discharging unit water inlet; 6102—first water tube storage rack; 6103—second water tube; 6104—water discharging unit motor; 6105—roller wheel; 6106—roller wheel holder; 6107—water discharging unit water outlet;
6200—connecting tube;
6300—electric diverter valve;
6400—extensible water pumping unit; 6401—water pumping unit motor; 6402—second water tube storage rack; 6403—third water tube; 6404—water pumping unit water outlet; 6405—water pumping unit water inlet; 6406—water pumping unit water pump.

DETAILED DESCRIPTION OF THE EMBODIMENTS

A multifunctional construction site cleaning robot and a cleaning method using the same provided by the disclosure will be described below in detail with reference to FIG. 1 to FIG. 23.

As shown in FIG. 1, the multifunctional construction site cleaning robot of the disclosure sequentially includes a bottom rotatable function part 1000, a chassis part 2000, a debris treatment part 3000, a container exchange part 4000, a spray part 5000 and a water transfer part 6000 from bottom to top. A turntable motor 1300 in the bottom rotatable function part 1000 is fixed to a middle position of a bottom of a steel plate 2209 in the chassis part 2000 through bolts and nuts. First steel channels 3200 in the debris treatment part 3000 are fixed to a top surface of the steel plate 2209 in the chassis part 2000 through bolts and nuts. A debris container 3300 is welded to a circular slot 2210 in the chassis part 2000. Second steel channels 4101 in the container exchange part 4000 are fixed to the steel plate 2209 in the chassis part 2000 through bolts and nuts. A water tube holder 5002 in the spray part 5000 is welded to the steel plate 2209 of the chassis part 2000. Water tube storage racks in the water transfer part 6000 are welded to the steel plate 2209 of the chassis part 2000.

When light and small debris on the construction site needs to be removed, a leaf remover unit 1400 in the bottom rotatable function part 1000 may be used in combination with the debris treatment part 3000. During the moving process of the robot, a fan 3305 of the debris treatment part 3000 is started, such that the debris can be sucked into the debris container 3300 in the debris treatment part 3000 through a suction nozzle 1408 of the leaf remover unit 1400, thereby removing the light and small debris. When heavy debris on the construction site needs to be removed, a sweeper unit 1100 in the bottom rotatable function part 1000 may be used in combination with a multi-openable-door support plate unit 2200 in the chassis part 2000 and the container exchange part 4000. Before the robot moves, a movable gripper unit 4100 moves an openable container 4200 to a rectangular slot in the chassis part 2000, and the openable container 4200 is lowered to a proper position. At this time, a second openable door 2205 in the multi-openable-door support plate unit 2200 can just pass through handles of the openable container 4200 to fix the container. The robot is started, a roller broom 1110 in the sweeper unit 1100 keeps rotating so as to sweep the debris into a dustpan 1105. After the dustpan 1105 is full of the debris, the debris may be dumped into the openable container 4200, thereby removing the large debris on the construction site. When cement agglomerates or weeds/shrubs on the construction site need to be removed, a cutter unit 1500 and the sweeper unit 1100 in the bottom rotatable function part 1000 may be used in combination. A target object is cut by the cutter unit 1500 and then removed by the sweeper unit 1100. When recyclable iron pieces on the construction site need to be removed, an iron remover unit 1200 in the bottom rotatable function part 1000 may be used in combination with the container exchange part 4000. Before use, two containers are arranged and respectively used for recycling the iron pieces and removing the debris. When the containers need to be exchanged, the movable gripper unit 4100 in the container exchange part 4000 may be used to exchange the containers. When in use, an electromagnetic roller 1206 and an iron remover motor are started first, such that the iron pieces are uniformly attached to the electromagnetic roller 1206. Then, the electromagnetic roller 1206 is extended into a container slot, and the electromagnetic roller 1206 is powered off to remove magnetic properties, such that the iron pieces naturally fall into the container, thereby recycling the iron pieces on the construction site. When the construction site needs to be prewetted or dedusted, the spray part 5000 is used to perform spray treatment on the construction site. Moreover, water may be supplied to a water tank in the spray part 5000 through an electric diverter valve 6300 in the water transfer part 6000, or the water tank may be changed through the movable gripper unit 4100 in the container exchange part 4000. When accumulated water on the construction site needs to be treated, a water outlet of an extensible water discharging unit 6100 in the water transfer part 6000 may be placed to a drainage ditch, a water tube may be extended while moving the robot to a vicinity of the accumulated water, a water pump in an extensible water pumping unit 6400 may be lowered into the accumulated water, and the water pump may be started to remove the accumulated water.

The existing cleaning robot typically only has a dust removal function, and cannot recycle iron pieces, remove heavy debris, cement agglomerates and accumulated water and classify debris on the construction site. In the disclosure, the iron remover unit, the cutter unit, the sweeper unit and the leaf remover unit are mounted on a cross iron bracket 1302, so that different function modules can be used according to different scenes. Moreover, a plurality of storage boxes provided in the disclosure are beneficial to classifying the debris. For example, light and small debris may be stored in one box and then pulverized and compressed so as to reduce space, heavy debris may be stored in another box, and iron pieces may be separately stored in another box for recycling. Besides, the disclosure integrates multiple removal functions, which is beneficial to enhancing the cleaning efficiency and improving the construction environment of workers from various aspects.

Figure 2:
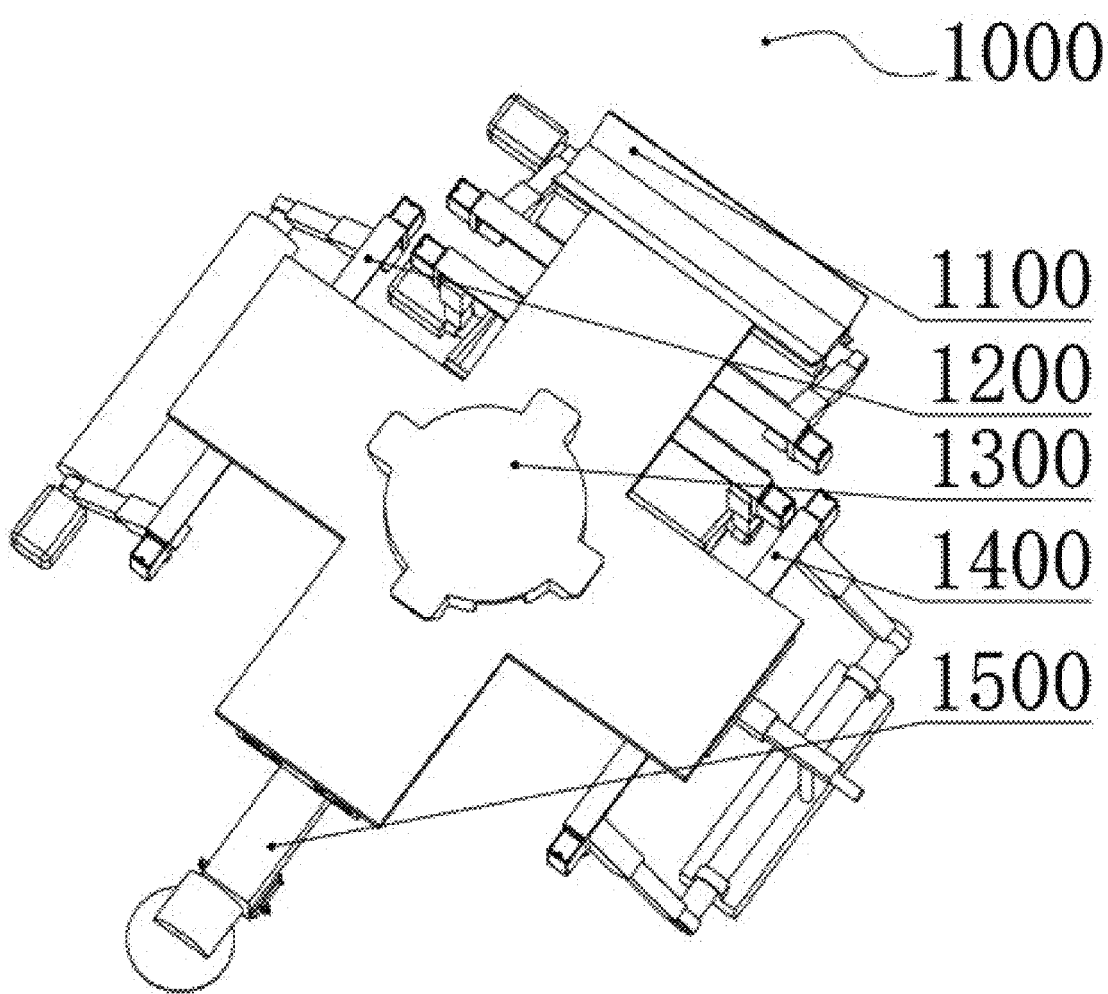
FIG. 2 is a schematic view of a bottom rotatable function part according to the disclosure.

As shown in FIG. 2, the bottom rotatable function part 1000 includes the rotatable cross bracket unit 1300, the sweeper unit 1100, the iron remover unit 1200, the leaf remover unit 1400 and the cutter unit 1500. The sweeper unit 1100, the iron remover unit 1200, the leaf remover unit 1400 and the cutter unit 1500 are respectively fixed to four corners of the rotatable cross bracket unit 1300 through a sweeper replaceable support plate 1101, an iron remover replaceable support plate 1201, a leaf remover replaceable support plate 1401 and a cutter replaceable support plate 1510.

Figure 3:
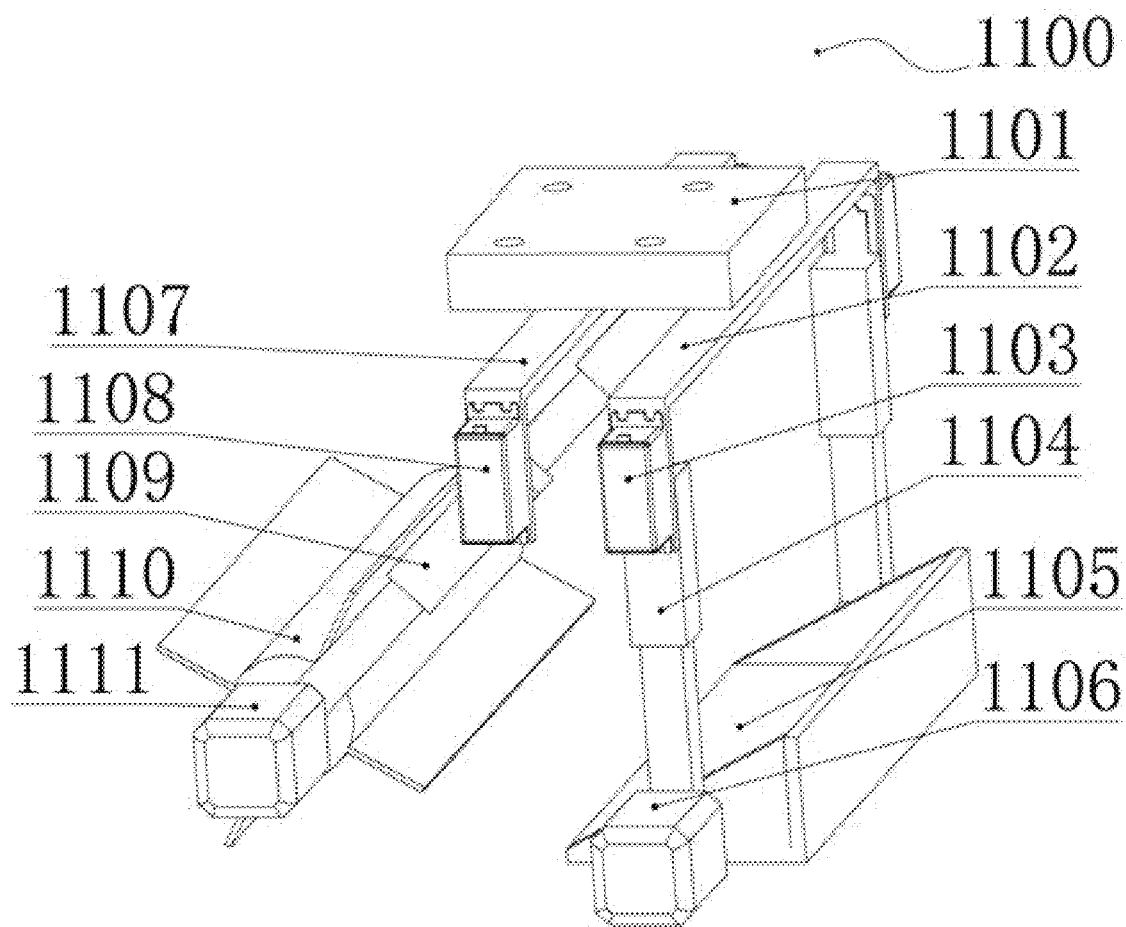
FIG. 3 is a schematic view of a sweeper unit of the bottom rotatable function part.
Figure 4:
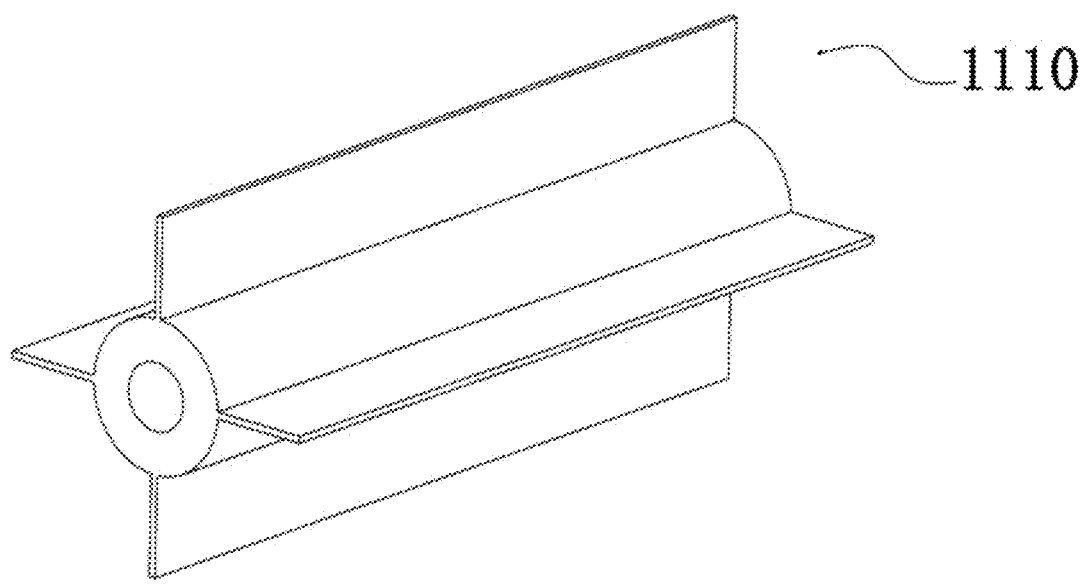
FIG. 4 is a schematic view of a roller broom of the sweeper unit.

The cutter unit 1500 and the sweeper unit 1100 may be used in combination for cleaning away cement agglomerates or weeds/shrubs. A target object is cut by the cutter unit 1500 and then removed by the sweeper unit 1100. As shown in FIG. 3 and FIG. 4, the sweeper unit 1100 includes a broom mechanism on the left side and a dustpan mechanism on the right side. The dustpan mechanism sequentially includes the sweeper replaceable support plate 1101, a sweeper first u-shaped steel 1102, sweeper first steering engines 1103, sweeper first linear actuators 1104, a dustpan 1105 and a sweeper first motor 1106 from top to bottom. The broom mechanism sequentially includes a sweeper second u-shaped steel 1107, sweeper second steering engines 1108, sweeper second linear actuators 1109, the roller broom 1110 and a sweeper second motor 1111 from top to bottom. The roller broom 1110 is a special-shaped piece formed by a roller and four iron sheets uniformly distributed on a circumferential surface of the roller. The sweeper replaceable support plate 1101 is fixed to the cross iron bracket 1302 through nuts, the sweeper first u-shaped steel 1102 is welded to the sweeper replaceable support plate 1101, the sweeper first steering engines 1103 are fixed to the sweeper first u-shaped steel 1102, the sweeper first linear actuator 1104 is connected to an output shaft of the sweeper first steering engine 1103, and an output shaft of the sweeper first motor 1106 runs through an output shaft of the sweeper first linear actuator 1104 and is connected to the dustpan 1105. The sweeper second u-shaped steel 1107 is fixed to the sweeper replaceable support plate 1101, the sweeper second steering engines 1108 are fixed to the sweeper second u-shaped steel 1107, the sweeper second linear actuator 1109 is connected to an output shaft of the sweeper second steering engine 1108, and an output shaft of the sweeper second motor 1111 runs through an output shaft of the sweeper second linear actuator 1109 and is connected to the roller broom 1110.

The sweeper first steering engines 1103 can adjust an included angle between the sweeper first linear actuators 1104 and the ground, the sweeper first linear actuators 1104 can adjust a height of the dustpan 1105, and the sweeper first motor 1106 can adjust an angle between the dustpan 1105 and the ground. The sweeper second steering engines 1108 can adjust an included angle between the sweeper second linear actuators 1109 and the ground, the sweeper second linear actuators 1109 can adjust a height of the roller broom 1110, and the sweeper second motor 1111 can control the roller broom 1110 to rotate. Before using the sweeper unit 1100, the sweeper first motor 1106 is started to control the dustpan 1105 to be parallel with the ground, the sweeper first linear actuators 1104 are started to control the dustpan 1105 to be closely attached to the ground, the sweeper second linear actuators 1109 are started to control the iron sheets of the roller broom 1110 to be close to the target debris, and the sweeper second motor 1111 is started to control the roller broom 1110 to rotate so as to sweep the debris into the dustpan 1105. After the dustpan 1105 is full of the debris, the sweeper second linear actuators 1109 may be controlled to retract the roller broom 1110 upward, the sweeper first steering engines 1103 may be controlled to make the dustpan 1105 move toward an aluminum box slot 4202 in the openable container 4200, and at the same time, the sweeper first motor 1106 may be started to finely adjust the dustpan 1105, so that an opening of the dustpan 1105 faces up, which prevents the debris from falling. When the dustpan 1105 is extended into the slot, the opening of the dustpan 1105 is controlled to face down so as to dump the debris.

Figure 5:
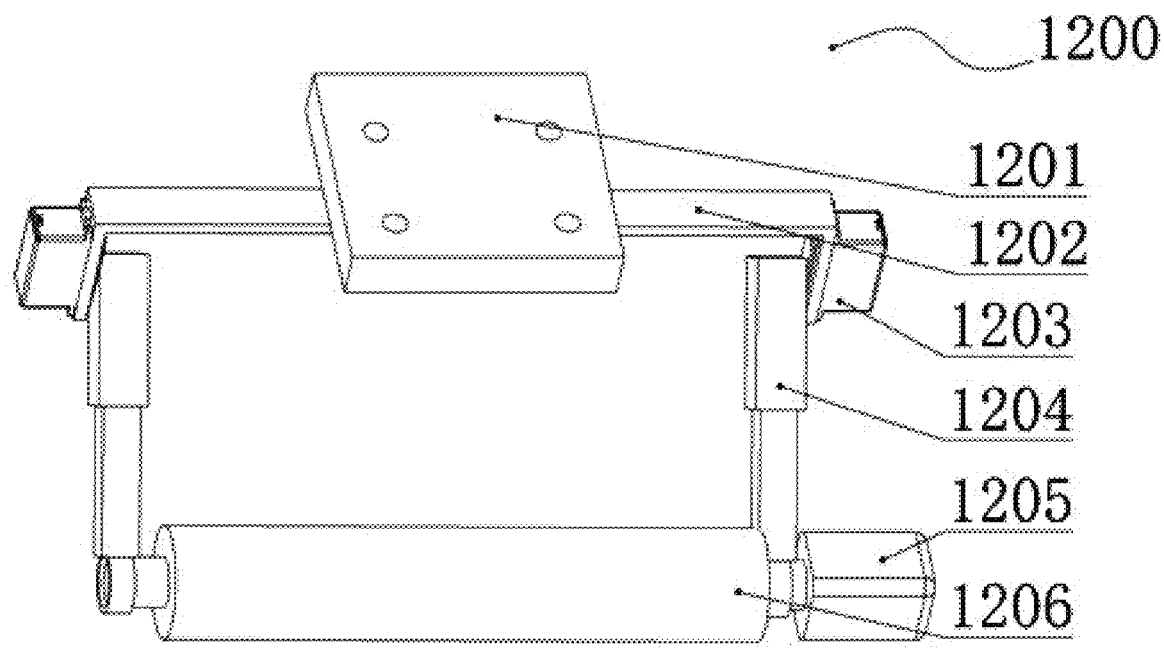
FIG. 5 is a schematic view of an iron remover unit of the bottom rotatable function part.

As shown in FIG. 5, the iron remover unit 1200 sequentially includes the iron remover replaceable support plate 1201, an iron remover u-shaped steel 1202, iron remover steering engines 1203, iron remover linear actuators 1204, an iron remover motor 1205 and the electromagnetic roller 1206 from top to bottom. The iron remover replaceable support plate 1201 is fixed to the cross iron bracket 1302 through nuts, the iron remover u-shaped steel 1202 is fixed to the iron remover replaceable support plate 1201, the iron remover steering engines 1203 are fixed to the iron remover u-shaped steel 1202, the iron remover linear actuator 1204 is connected to an output shaft of the iron remover steering engine 1203, and an output shaft of the iron remover motor 1205 runs through an output shaft of the iron remover linear actuator 1204 and is connected to the electromagnetic roller 1206. Before use, the iron remover linear actuators 1204 are started to adjust a height of the electromagnetic roller 1206, the electromagnetic roller 1206 is powered on, and the iron remover motor 1205 is started to control the electromagnetic roller 1206 to rotate so as to facilitate uniform attachment of the iron pieces. When the iron pieces 1206 attached to the electromagnetic roller reach a certain weight, the iron remover steering engines 1203 are started to control the electromagnetic roller 1206 to move to the aluminum box slot 4202 in the openable container 4200. When the electromagnetic roller 1206 is completely extended into the slot, the electromagnetic roller 1206 is powered off to remove magnetic properties, and the iron pieces naturally fall into the container.

Figure 6:
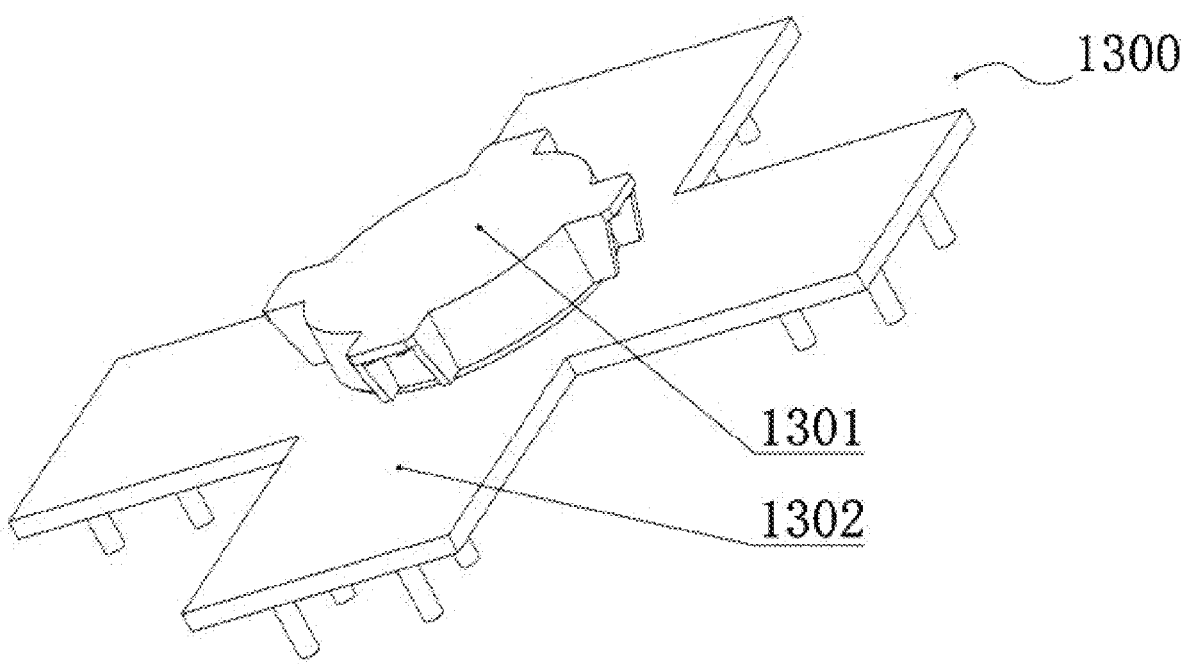
FIG. 6 is a schematic view of a rotatable cross bracket unit of the bottom rotatable function part.

As shown in FIG. 6, the rotatable cross bracket unit 1300 includes a turntable motor 1301 and the cross iron bracket 1302. The cross iron bracket 1302 is a special-shaped piece formed by welding a cross iron plate and sixteen bolts. The bolts in the cross iron bracket 1302 are provided to facilitate demounting and mounting of the function units. The turntable motor 1301 can adjust positions of the four function units at the bottom of the cross iron bracket 1302, and may be used in combination with mecanum wheels 2101 described below to change the positions of the function units when the robot moves back and forth, moves laterally and moves diagonally.

Figure 7:
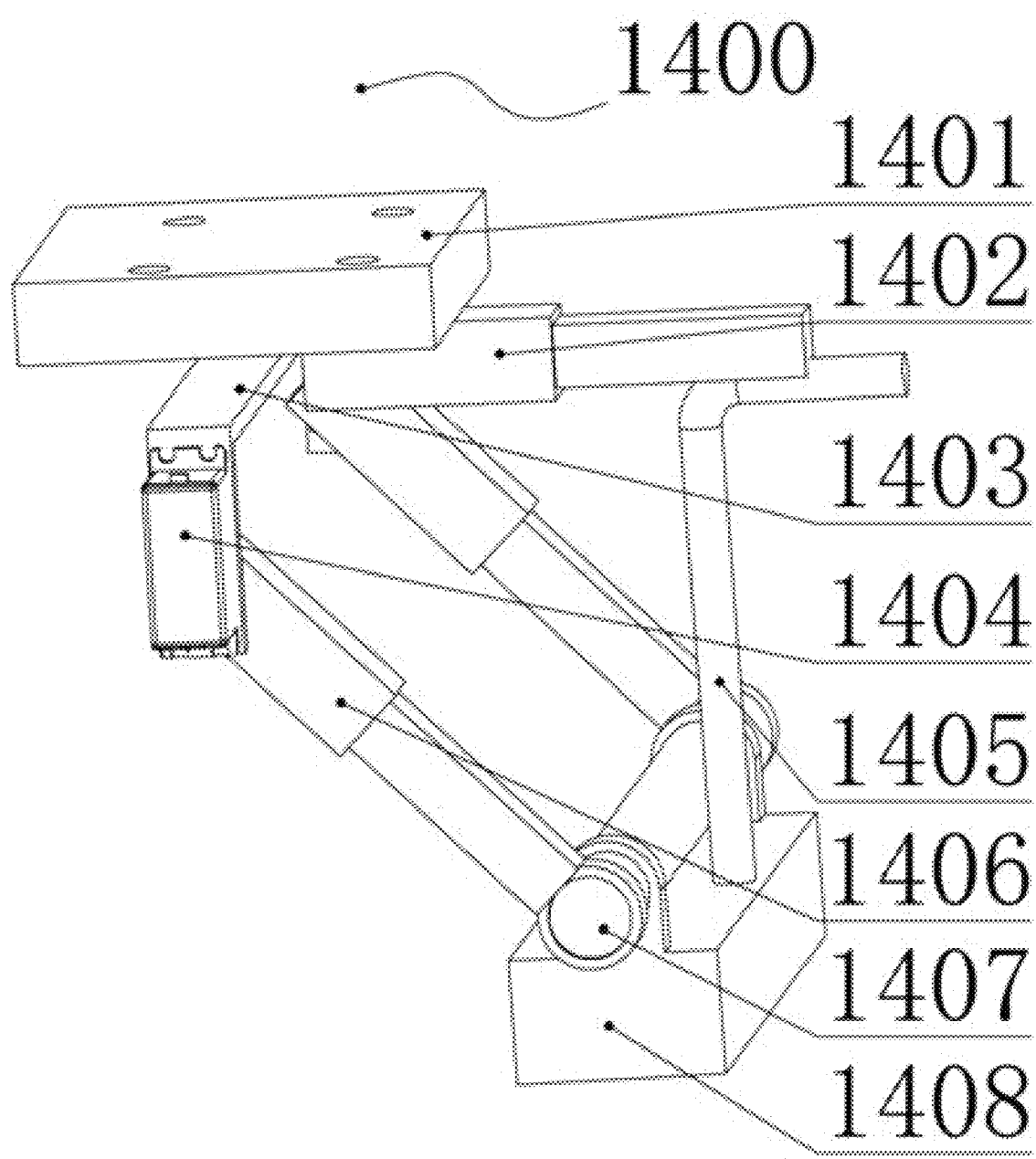
FIG. 7 is a schematic view of a leaf remover unit of the bottom rotatable function part.

As shown in FIG. 7, the leaf remover unit 1400 sequentially includes the leaf remover replaceable support plate 1401, a leaf remover first linear actuator 1402, a leaf remover u-shaped steel 1403, a conduit 1405, leaf remover second linear actuators 1406, a round rod 1407 and the suction nozzle 1408 from top to bottom. The leaf remover replaceable support plate 1401 is fixed to the cross iron bracket 1302 through nuts, the leaf remover u-shaped steel 1403 and the leaf remover first linear actuator 1402 are fixed to the leaf remover replaceable support plate 1401, leaf remover steering engines 1404 are fixed to the leaf remover u-shaped steel 1403, the leaf remover second linear actuator 1406 is connected to an output shaft of the leaf remover steering engine 1404, and output shafts of the leaf remover second linear actuators 1406 are connected to the suction nozzle 1408 through the round rod 1407. An inlet at a lower end of the conduit 1405 is connected to the suction nozzle 1408, an upper end of the conduit 1405 is fixed to an output shaft of the leaf remover first linear actuator 1402, and an outlet of the conduit is connected to the fan 3305 of the debris container 3300. Before use, the turntable motor 1301 is rotated such that the leaf remover unit 1400 faces the debris container 3300, the leaf remover first linear actuator 1402 is extended and retracted to control the conduit 1405 to be inserted into the fan 3305 in the debris container 3300, the fan 3305 is started, and the whole cleaning robot is moved to remove the light and small debris on the construction site.

Figure 8:
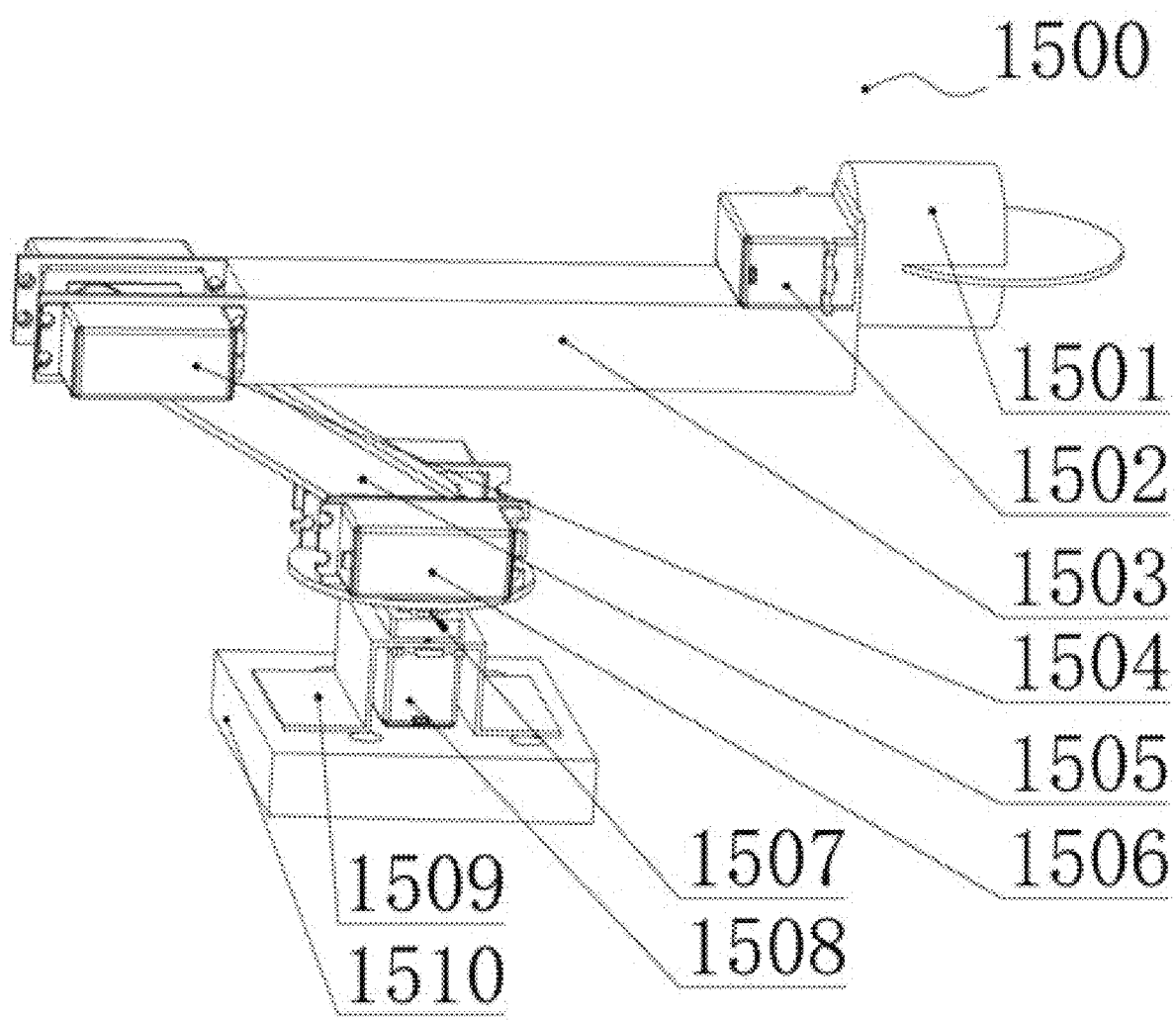
FIG. 8 is a schematic view of a cutter unit of the bottom rotatable function part.
Figure 9:
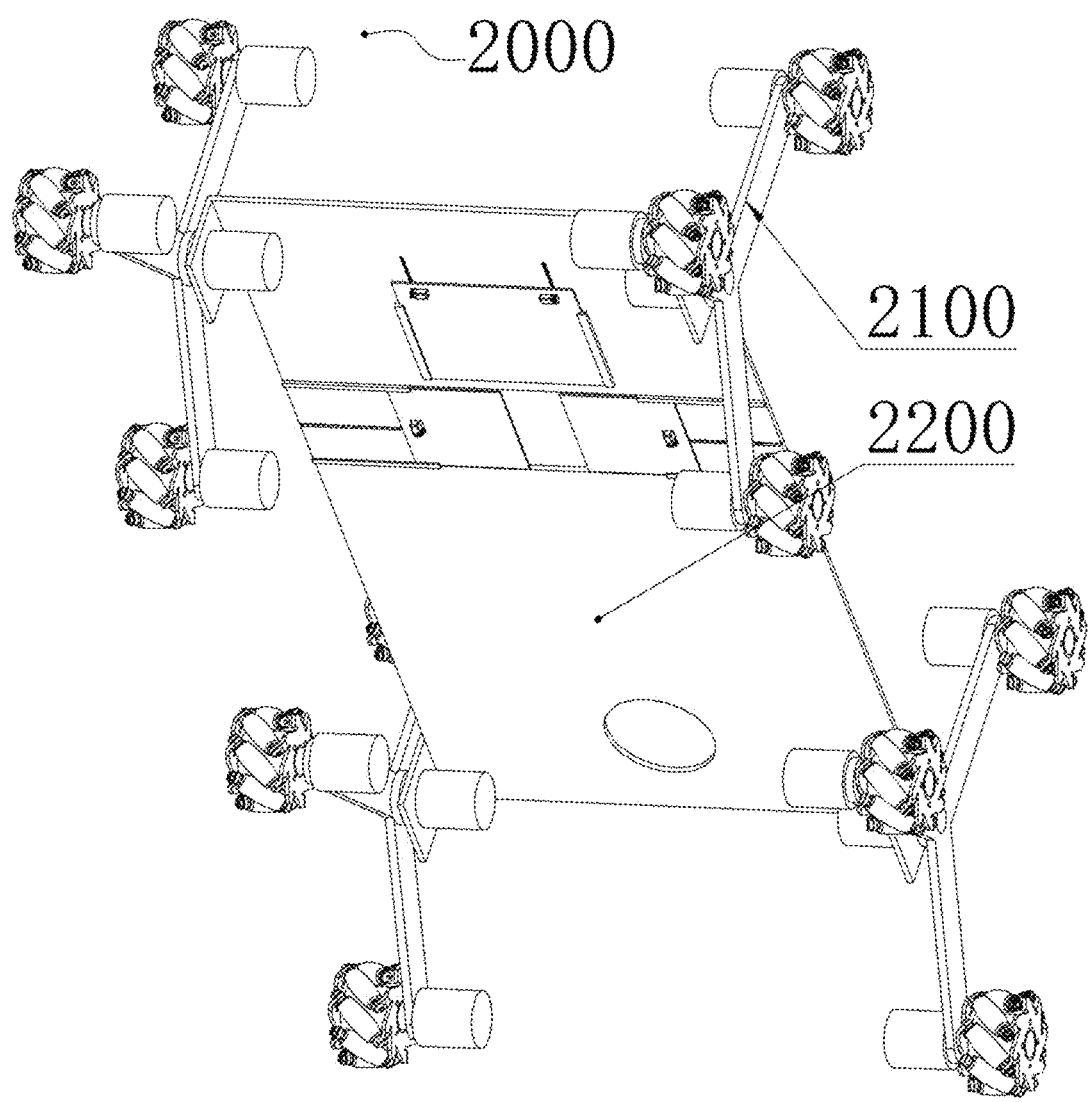
FIG. 9 is a schematic view of a chassis part according to the disclosure.
Figure 10:
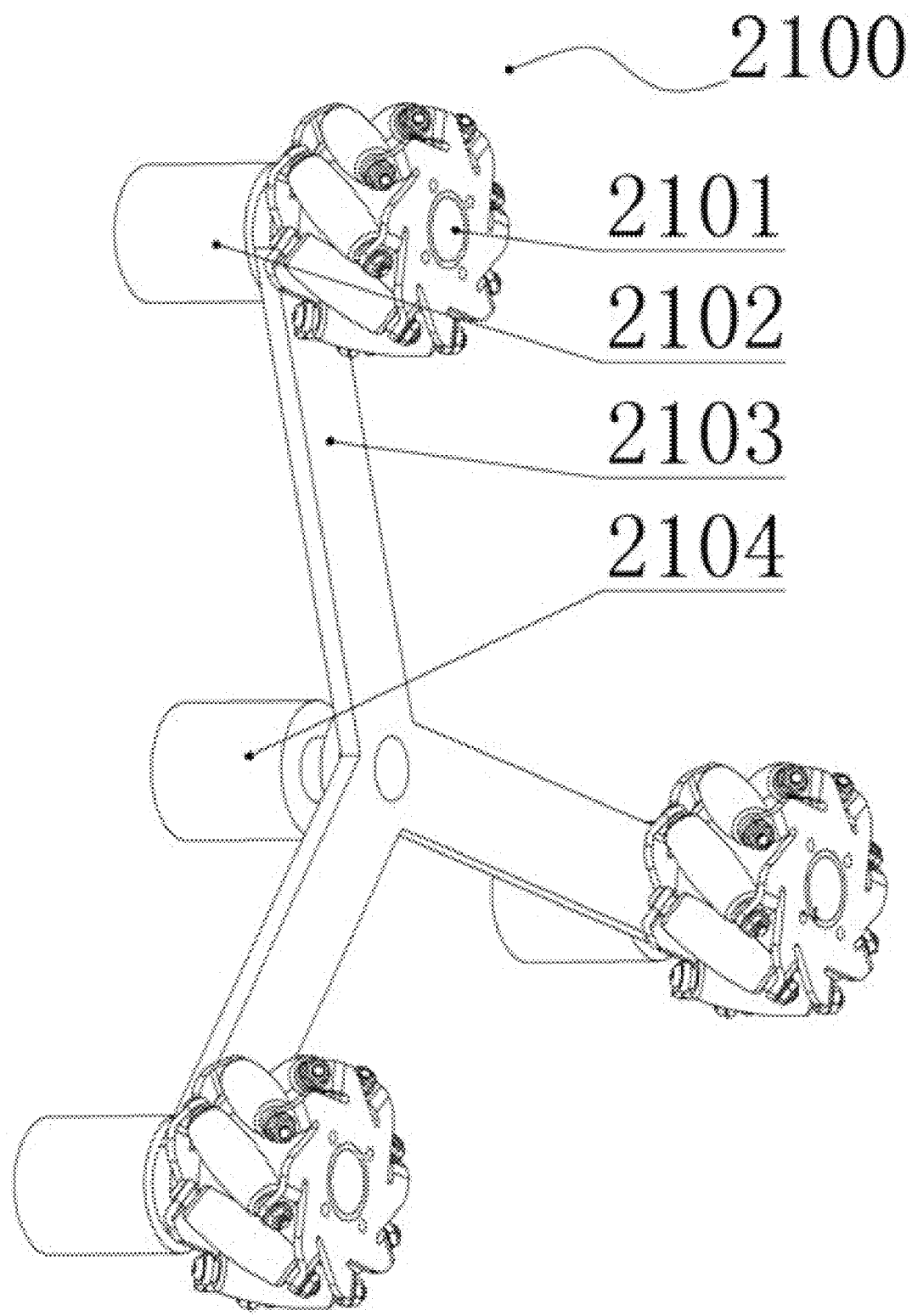
FIG. 10 is a schematic view of a three-wheel unit of the chassis part.
Figure 11:
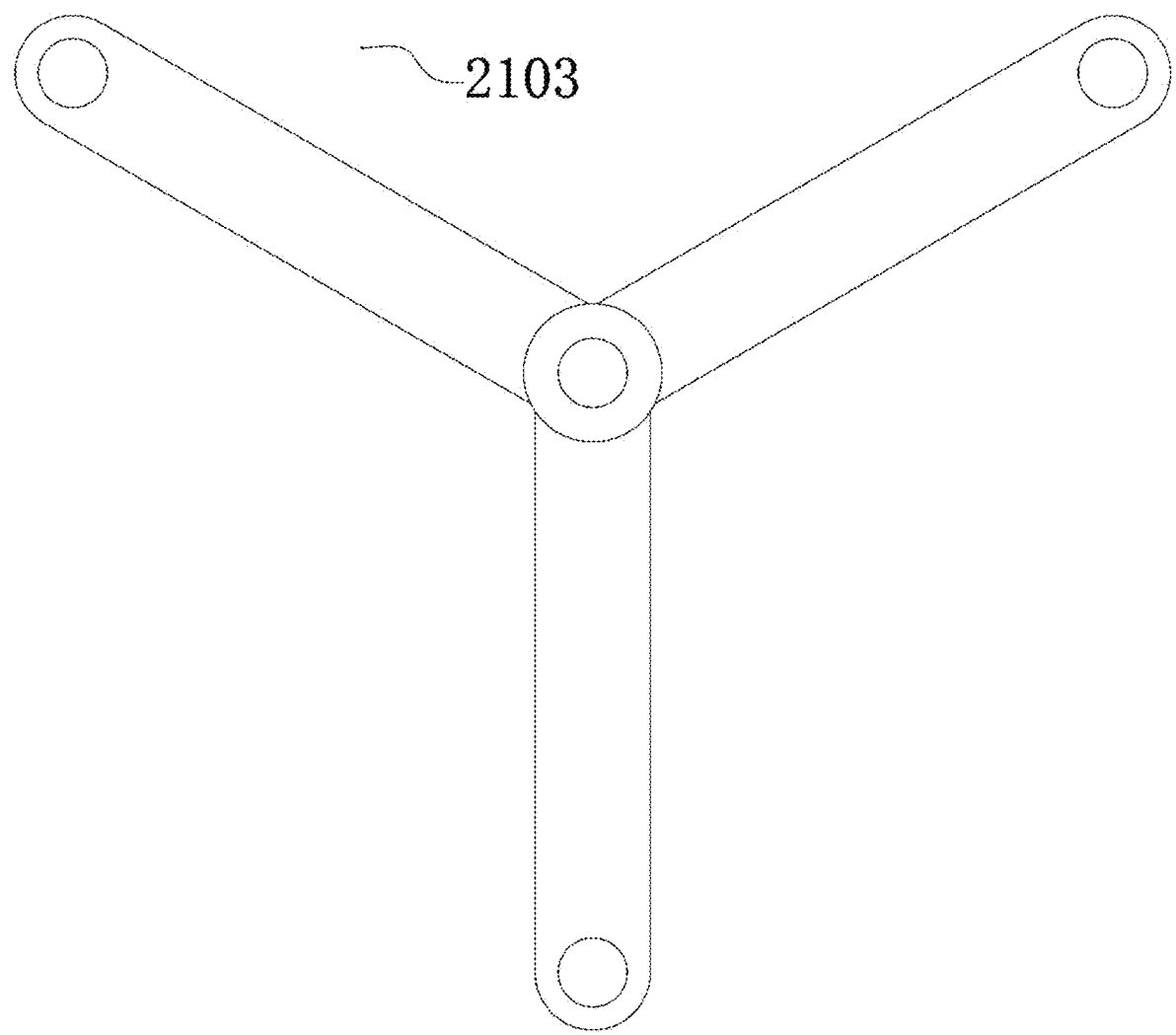
FIG. 11 is a schematic view of a three-shaft link of the three-wheel unit.
Figure 12:
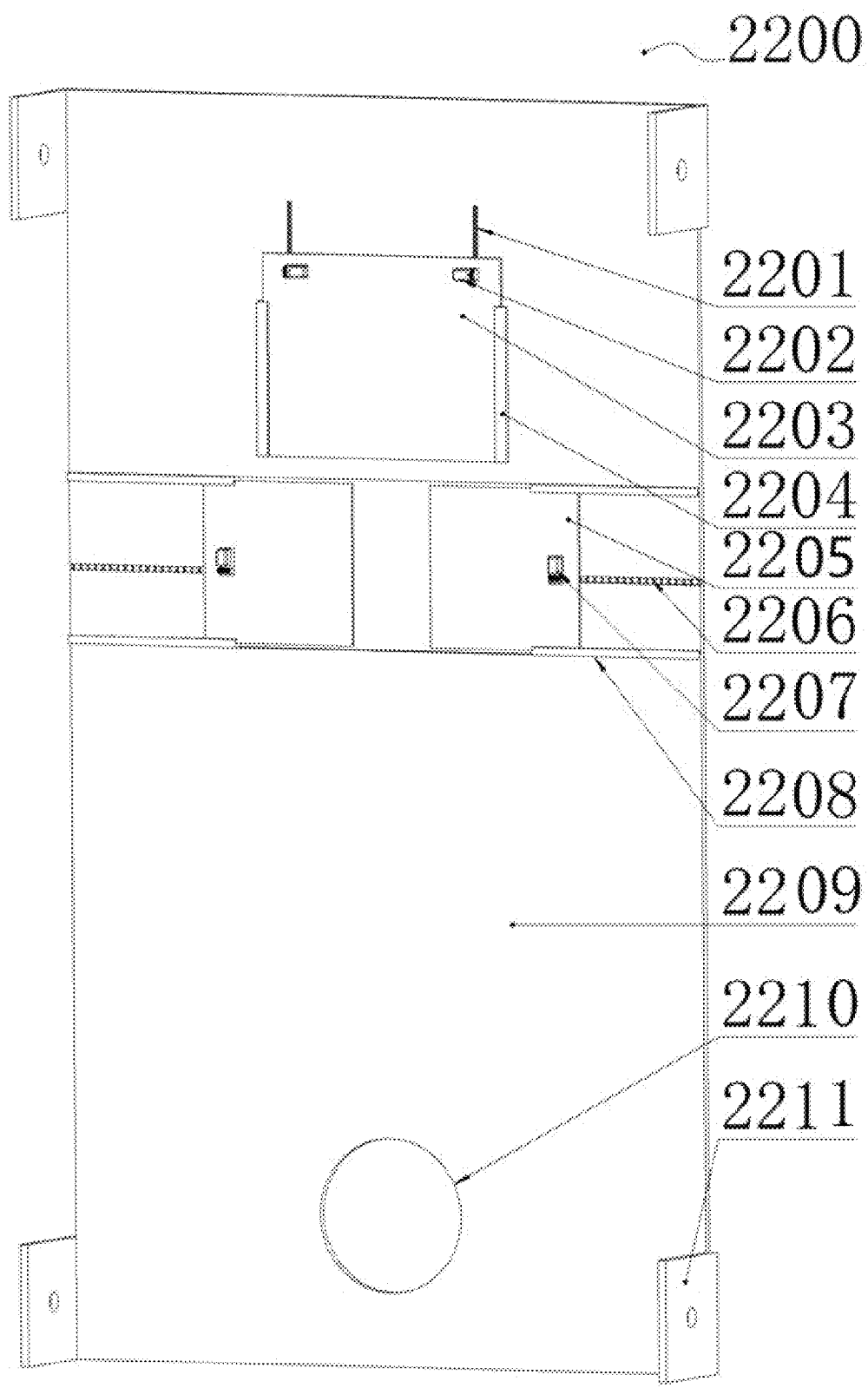
FIG. 12 is a schematic view of a multi-openable-door support plate unit of the chassis part.

As shown in FIG. 8, the cutter unit 1500 sequentially includes a cutter 1501, a cutter first steering engine 1502, a cutter first link 1503, a cutter second steering engine 1504, a cutter second link 1505, a cutter third steering engine 1506, a steering engine turntable 1507, a cutter fourth steering engine 1508, a steering engine fixing plate 1509 and a cutter replaceable support plate 1510 from top to bottom. The cutter replaceable support plate 1510 is fixed to the cross iron bracket 1302 through nuts, the steering engine fixing plate 1509 fixes the cutter fourth steering engine 1508 to the cutter replaceable support plate 1510, the steering engine turntable 1507 is connected to an output shaft of the cutter fourth steering engine 1508, the cutter third steering engine 1506 is fixed to the steering engine turntable 1507, one end of the cutter second link 1505 is connected to an output shaft of the cutter third steering engine 1506, the other end is connected to the cutter second steering engine 1504, the cutter second steering engine 1504 and the cutter first steering engine 1502 are respectively fixed to two ends of the cutter first link 1503, and the cutter 1501 is connected to an output shaft of the cutter first steering engine 1502. The cutter second steering engine 1504 and the cutter third steering engine 1506 adjust a height of the cutter 1501 by adjusting angles of the cutter first link 1503 and the cutter second link 1505, the cutter fourth steering engine 1508 is capable of controlling the cutter 1501 to cut left and right, and the cutter first steering engine 1502 is capable of controlling a cutting direction of the cutter 1501.

As shown in FIG. 9, FIG. 10, FIG. 11 and FIG. 12, the chassis part 2000 includes three-wheel units 2100 and a multi-openable-door support plate unit 2200. The three-wheel units 2100 each sequentially include the mecanum wheels 2101, three-wheel unit first motors 2102, a three-shaft link 2103 and a three-wheel unit second motor 2104 from top to bottom. The three-shaft link 2103 is a special-shaped piece which may be formed by cutting a steel plate. The three three-wheel unit first motors 2102 are fixed to three corners of the three-shaft link 2103, the three mecanum wheels 2101 are respectively connected to output shafts of the three-wheel unit first motors 2102, the three-wheel unit second motor 2104 is fixed to a perforated steel plate 2211 in the multi-openable-door support plate unit 2200, and an output shaft of the three-wheel unit second motor is connected to a center of the three-shaft link 2103. When the cleaning robot travels on a flat surface, two of the mecanum wheels 2101 are on the ground, and by controlling speeds of the three-wheel unit first motors 2102 of the two mecanum wheels 2101 on the ground, the cleaning robot is capable of moving back and forth, moving laterally, moving diagonally and rotating in situ, which is beneficial for the robot to plan a better traveling route. The existing cleaning robot typically can travel only on a flat surface and does not have a stair climbing mechanism, which makes its cleaning range limited. In the disclosure, three-wheel mechanisms are designed. The three-wheel unit second motor 2104 may be controlled to make the whole three-wheel unit 2100 rotate. During the rotation, when a first mecanum wheel contacts a first step, the first mecanum wheel supports the whole robot to move forward such that a second mecanum wheel contacts a second step, and the process is repeated such that the robot is capable of climbing the stairs.

The multi-openable-door support plate unit 2200 sequentially includes first gear slots 2201, first gear motors 2202, a first openable door 2203, first steel angles 2204, second openable doors 2205, second gear slots 2206, second gear motors 2207, second steel angles 2208, the steel plate 2209, the circular slot 2210 and the perforated steel plates 2211 from top to bottom. The two first steel angles 2204 are welded on two sides of a water tank slot of the steel plate 2209, the first openable door 2203 is movable along grooves of the first steel angles 2204, the two first gear motors 2202 are fixed to two slots of the first openable door 2203, and a gear output shaft of the first gear motor 2202 meshes with the first gear slot 2201. The four second steel angles 2208 are fixed on two sides of container slots, the second openable door 2205 is movable along grooves of the second steel angles 2208, the second gear motor 2207 is fixed to the second openable door 2205, and a gear output shaft of the second gear motor 2207 meshes with the second gear slot 2206. The four perforated steel plates 2211 are respectively fixed to four corners of the steel plate 2209, and the perforated steel plate 2211 is configured to be connected to the three-wheel unit second motor 2104 in the three-wheel unit 2100.

When a water tank 5007 of the spray part 5000 needs to be changed, the first gear motors 2202 are started to control the first openable door 2203 to move up, and after the change of the water tank 5007 is completed, the first openable door 2203 is controlled to move down to support the water tank. When the debris or iron pieces collected by the bottom rotatable function part 1000 need to be dumped into the openable container 4200, the second gear motors 2207 are started to control the second openable door 2205 to move outward, such that the openable container 4200 can be extended into the container slot. When the openable container 4200 is lowered to a proper position, the second openable door 2205 is controlled to move inward so as to be clamped into aluminum box handles 4203 in the openable container 4200, thereby functioning to support the openable container 4200. The circular slot 2210 is configured to accommodate the debris container 3300.

Figure 13:
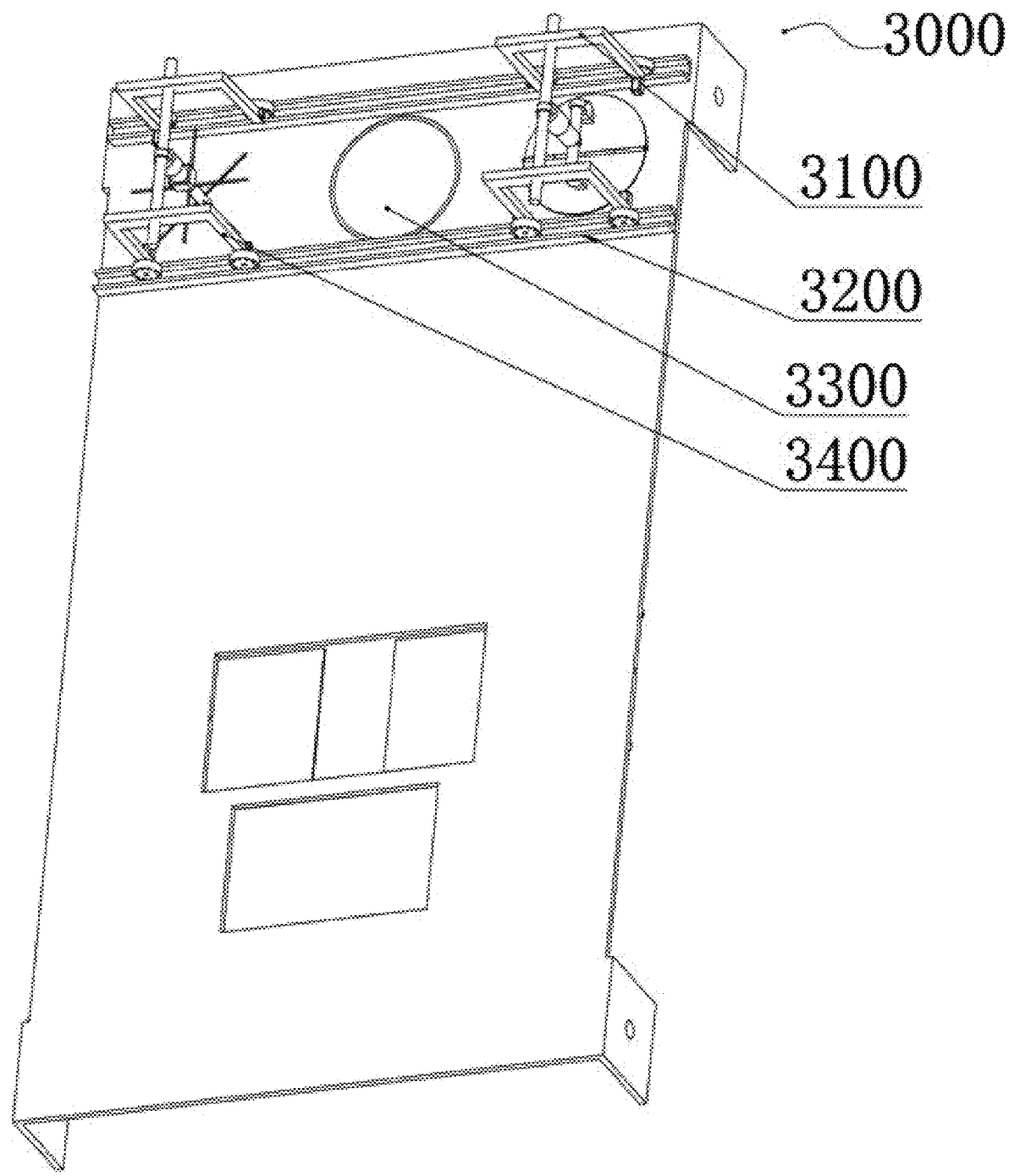
FIG. 13 is a schematic view of a debris treatment part according to the disclosure.

As shown in FIG. 13, the debris treatment part 3000 includes a compression unit 3100, the first steel channels 3200, the debris container 3300 and a pulverizing unit 3400. First perforated casters 3103 and second perforated casters 3105 in the compression unit 3100 are movable along the first steel channels 3200. Perforated casters in the pulverizing unit 3400 are movable along the first steel channels 3200. The first steel channels 3200 are fixed to the steel plate 2209. The debris container 3300 is fixed to the circular slot 2210 of the steel plate 2209. The pulverizing unit 3400 and the compression unit 3100 may be used in combination for pulverizing and compacting the debris in the debris container 3300, thereby reducing storage space.

Figure 14:
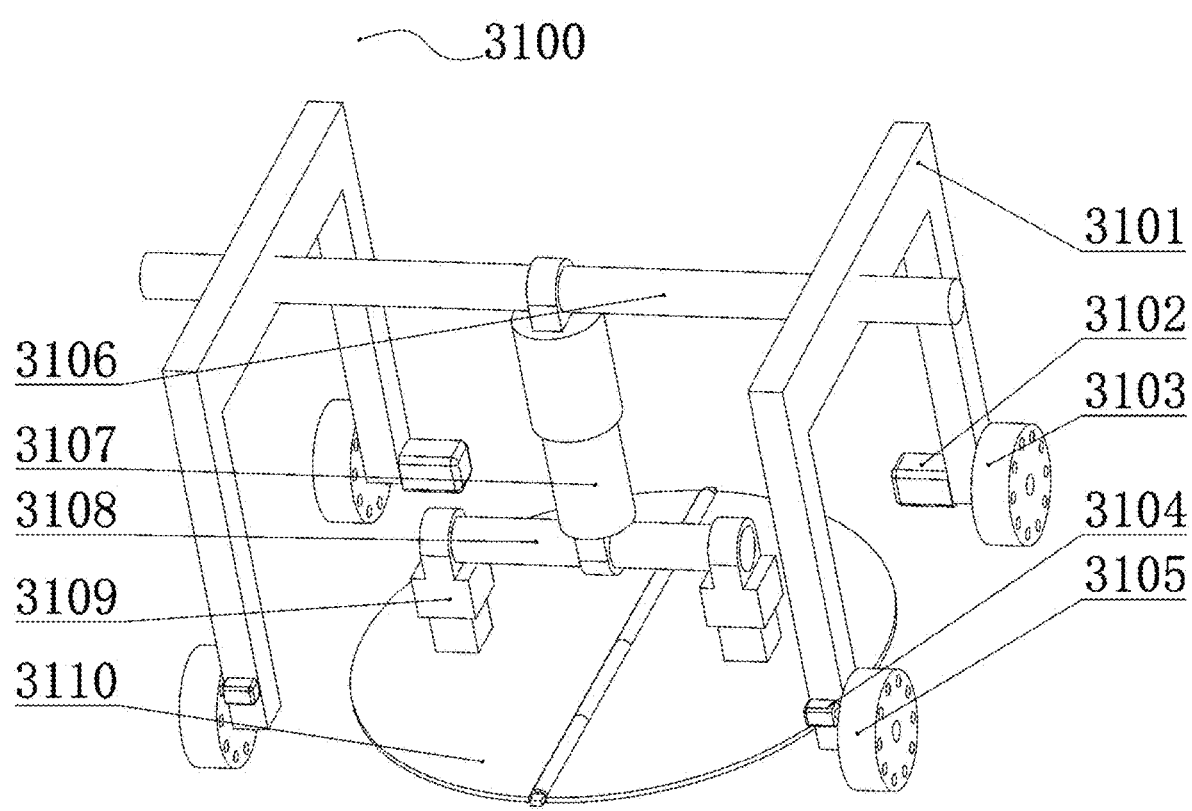
FIG. 14 is a schematic view of a compression unit of the debris treatment part.

As shown in FIG. 14, the compression unit 3100 includes traveling mechanisms on two sides and a compression mechanism located in a middle of the two traveling mechanisms, and the traveling mechanism sequentially includes a compression unit u-shaped strut 3101, a compression unit motor 3102, the first perforated caster 3103, a compression unit linear actuator 3104 and the second perforated caster 3105 from top to bottom. The compression mechanism sequentially includes a compression unit first round rod 3106, a compression unit oil cylinder 3107, a compression unit second round rod 3108, compression unit first links 3109 and a circular plate 3110 from top to bottom. An output shaft of the compression unit motor 3102 runs through the compression unit u-shaped strut 3101 and is connected to the first perforated caster 3103, the compression unit linear actuator 3104 is fixed to a side surface of the compression unit u-shaped strut 3101, the compression unit first round rod 3106 is fixed in a middle of the two compression unit u-shaped struts 3101, a cylinder body of the compression unit oil cylinder 3107 is fixed to the compression unit first round rod 3106, a cylinder plunger is connected to the compression unit second round rod 3108, and two ends of the compression unit second round rod 3108 are connected to the circular plate 3110 through the two compression unit first links 3109. Before the compression mechanism is in use, the compression unit motors 3102 are started to control the compression unit 3100 to move until the circular plate 3110 is coaxial with a drum 3301 of the debris container 3300, the compression unit motors 3102 are turned off, the compression unit linear actuators 3104 are started such that output shafts of the compression unit linear actuators are extended into small holes of the second perforated casters 3105 to prevent the compression unit 3100 from slipping during use of the compression mechanism, and the compression unit oil cylinder 3107 is started to control the circular plate 3110 to apply a pressure to the debris in the debris container 3300, so as to compress the debris, thus reducing space.

Figure 15:
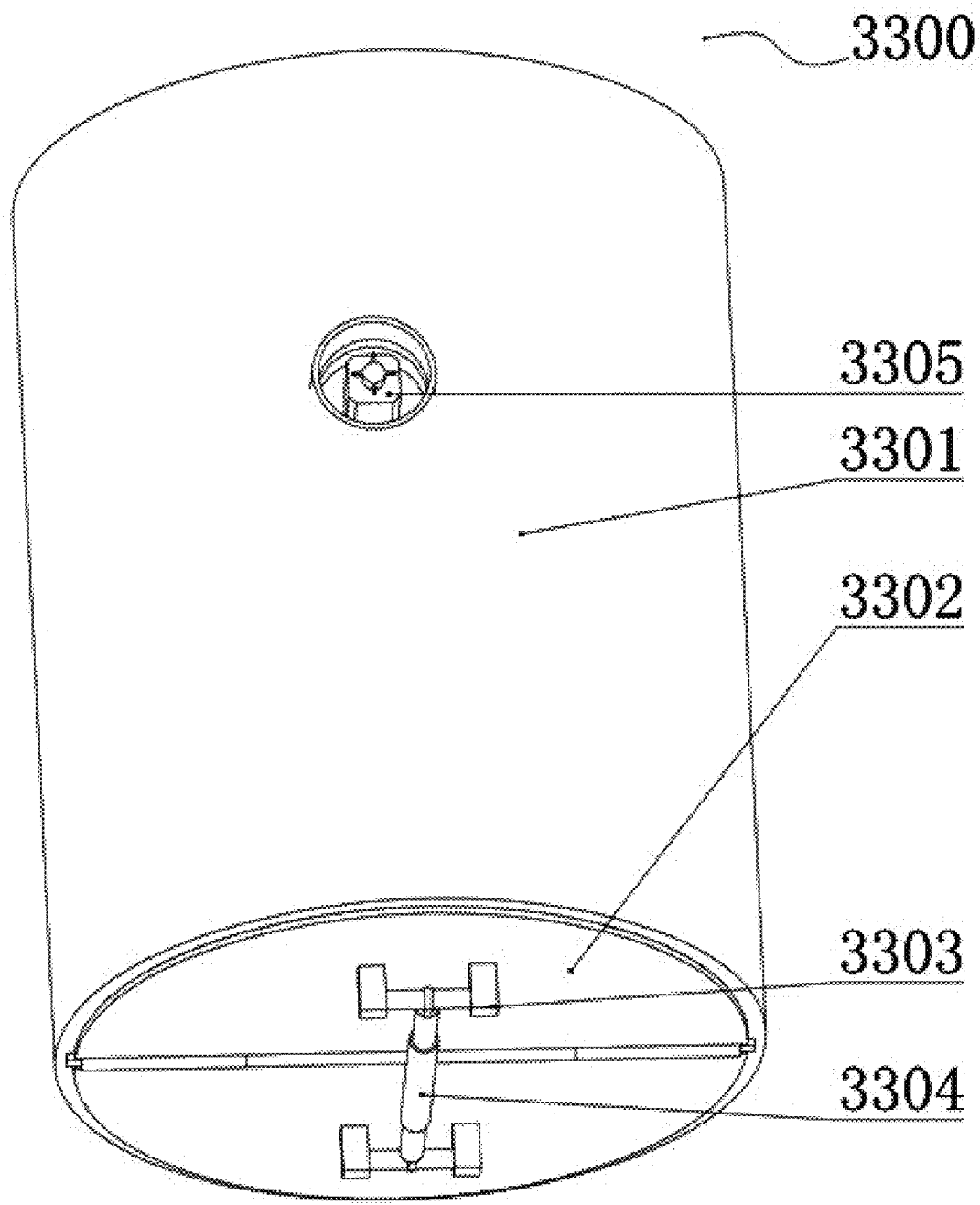
FIG. 15 is a schematic view of a debris container of the debris treatment part.

As shown in FIG. 15, the debris container 3300 sequentially includes the drum 3301, a circular hinged door 3302, debris container links 3303, a bidirectional linear actuator 3304 and the fan 3305 from top to bottom. The fan 3305 is connected to a slot on a side surface of the drum 3301, two ends of a middle rod in the circular hinged door 3302 are fixed to a bottom of the drum 3301, and the bidirectional linear actuator 3304 is fixed to the circular hinged door 3302 through the two debris container links 3303. The fan 3305 is configured to provide suction for the leaf remover unit 1400, and the bidirectional linear actuator 3304 is capable of opening the circular hinged door 3302 by retracting an output shaft so as to facilitate dumping of the debris in the debris container 3300.

Figure 16:
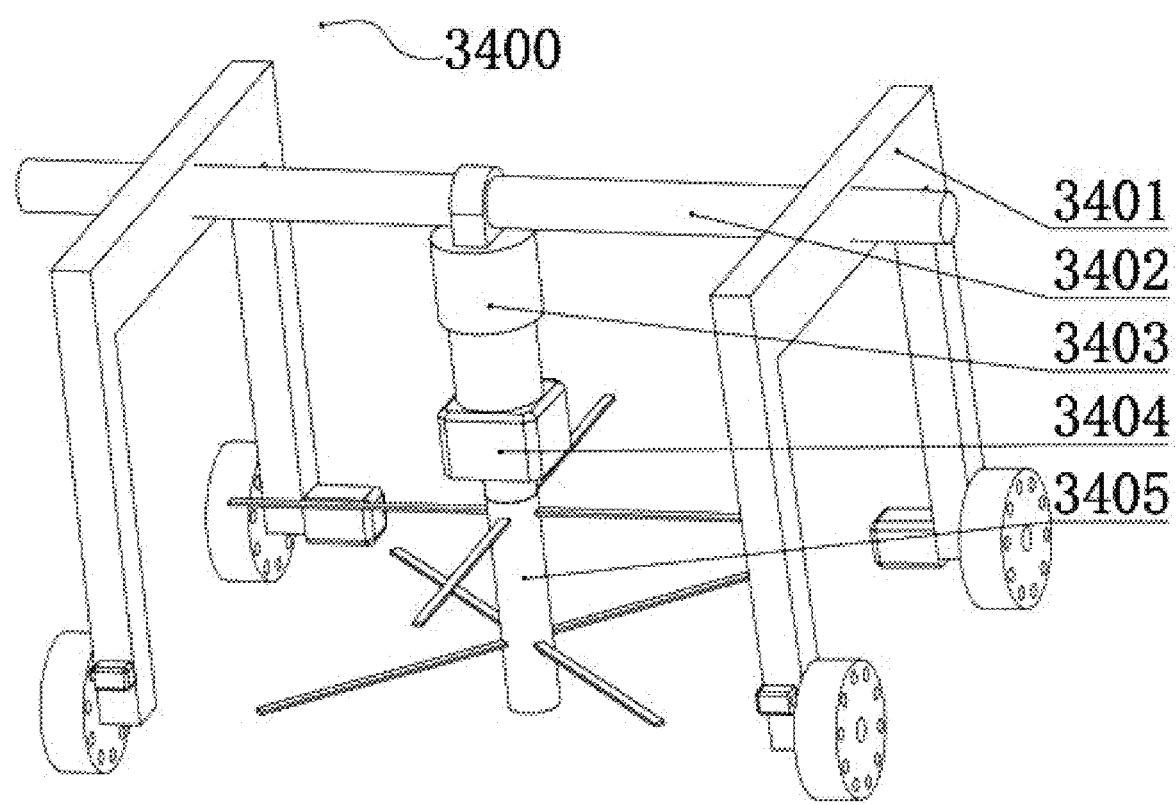
FIG. 16 is a schematic view of a pulverizing unit of the debris treatment part.

As shown in FIG. 16, the pulverizing unit 3400 includes traveling mechanisms on two sides and a pulverizing mechanism located in a middle of the two traveling mechanisms, and the traveling mechanism has same composition and functions as the traveling mechanism in the compression unit 3100. The pulverizing mechanism sequentially includes a pulverizing unit link 3402, a pulverizing unit oil cylinder 3403, a pulverizing unit motor 3404 and a blade holder 3405 from top to bottom. Two ends of the pulverizing unit link 3402 are fixed to the pulverizing unit u-shaped struts 3401 on the two sides, a cylinder body of the pulverizing unit oil cylinder 3403 is connected to the pulverizing unit link 3402, a cylinder plunger is connected to the pulverizing unit motor 3404, and the blade holder 3405 is fixed to an output shaft of the pulverizing unit motor 3404. The pulverizing unit 3400 has a same moving manner and a same anti-slip manner as those of the compression unit 3100, and after the blade holder 3405 is aligned with the drum 3301, the pulverizing unit motor 3404 is started to make blades on the blade holder 3405 rotate, and the pulverizing unit oil cylinder 3403 is started such that the blade holder 3405 is extended into the drum 3301 to pulverize the debris.

Figure 17:
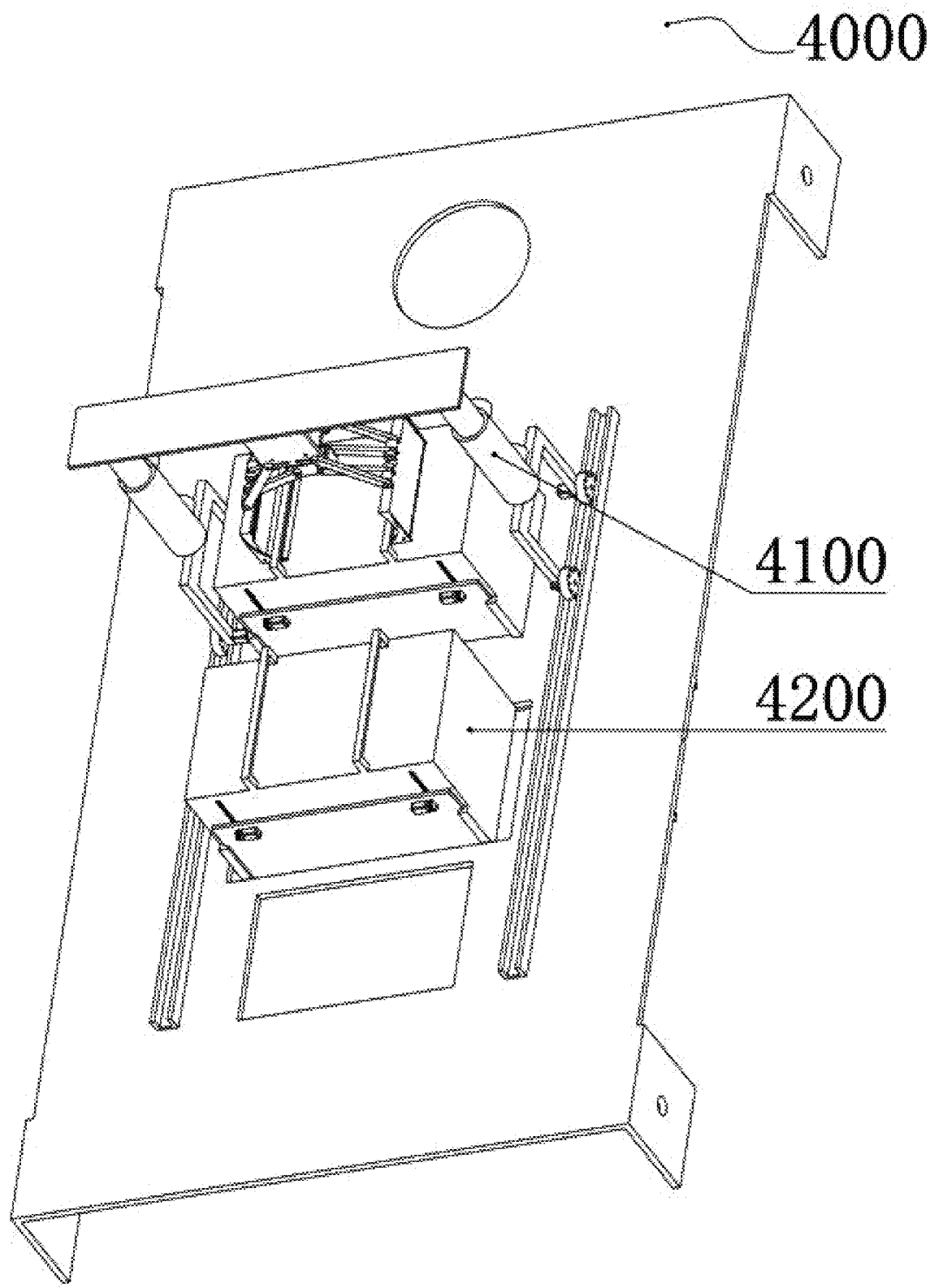
FIG. 17 is a schematic view of a container exchange part according to the disclosure.

As shown in FIG. 17, the container exchange part 4000 includes the movable gripper unit 4100 and the two openable containers 4200. The second steel channels 4101 in the movable gripper unit 4100 are fixed to the steel plate 2209. In order to classify the recyclable iron pieces and the unrecyclable cement agglomerates, the two openable containers 4200 are provided. When the containers need to be exchanged, the movable gripper unit 4100 may be used to exchange positions of the two openable containers 4200.

Figure 18:
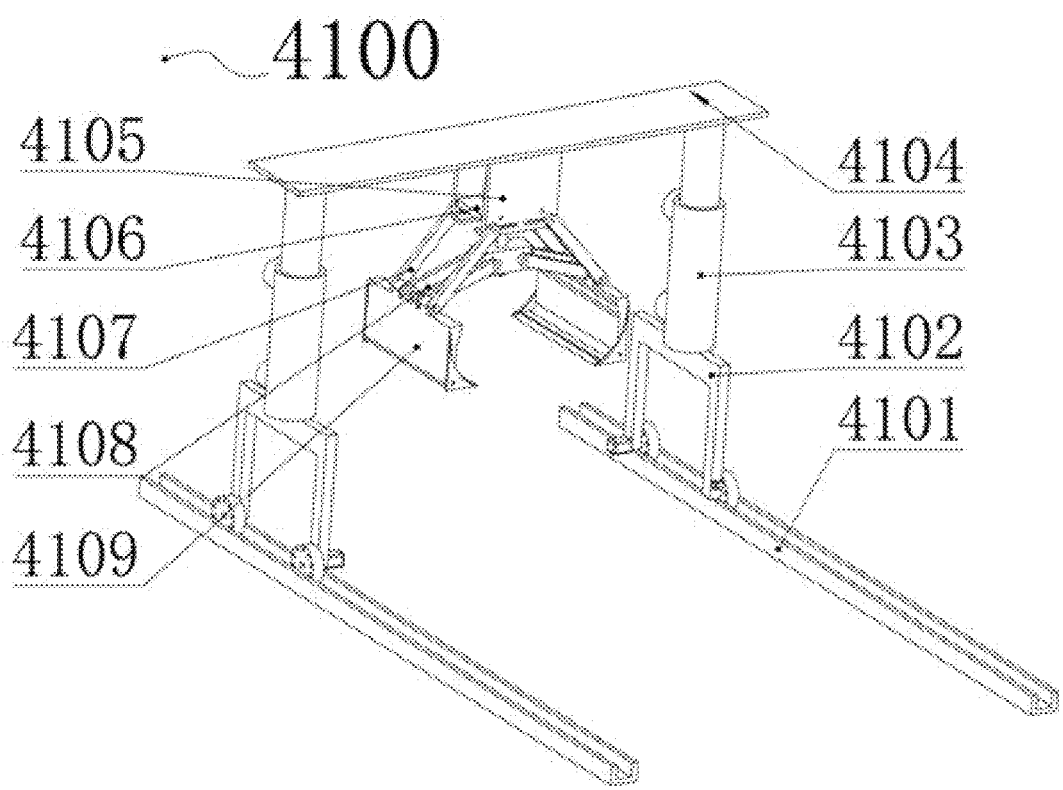
FIG. 18 is a schematic view of a movable gripper unit of the container exchange part.

As shown in FIG. 18, the movable gripper unit 4100 includes traveling devices on two sides and a gripper mechanism located in a middle of the two traveling devices. The traveling device sequentially includes the second steel channel 4101, a gripper unit u-shaped strut 4102, a gripper unit oil cylinder 4103 and a gripper first support plate 4104 from bottom to top. The gripper mechanism sequentially includes gripper second support plates 4105, a gripper third support plate 4106, gripper first links 4107, gripper second links 4108 and joints 4109 from top to bottom. A cylinder body of the gripper unit oil cylinder 4103 is fixed to the gripper unit u-shaped strut 4102, a cylinder plunger is connected to the gripper first support plate 4104, the two gripper second support plates 4105 are fixed to the gripper first support plate 4104, the gripper third support plate 4106 is fixed to the gripper second support plates 4105 so as to support a gripper oil cylinder, and the gripper oil cylinder is fixed to the gripper third support plate 4106. One end of the gripper first link 4107 is connected to the gripper second support plate 4105, and the other end is connected to the joint 4109. One end of the gripper second link 4108 is connected to a cylinder plunger of the gripper oil cylinder, and the other end is connected to the joint 4109. The movable gripper unit 4100 has a same moving manner and a same anti-slip manner as those of the compression unit 3100. When the containers need to be exchanged, the gripper unit oil cylinder 4103 is started to adjust a gripper to a proper height, the joints 4109 are started to grip the aluminum box handles 4203 of the first openable container 4200, the gripper is lifted, and the traveling devices are started to pass through the second openable container 4200, thereby exchanging the containers.

Figure 19A:
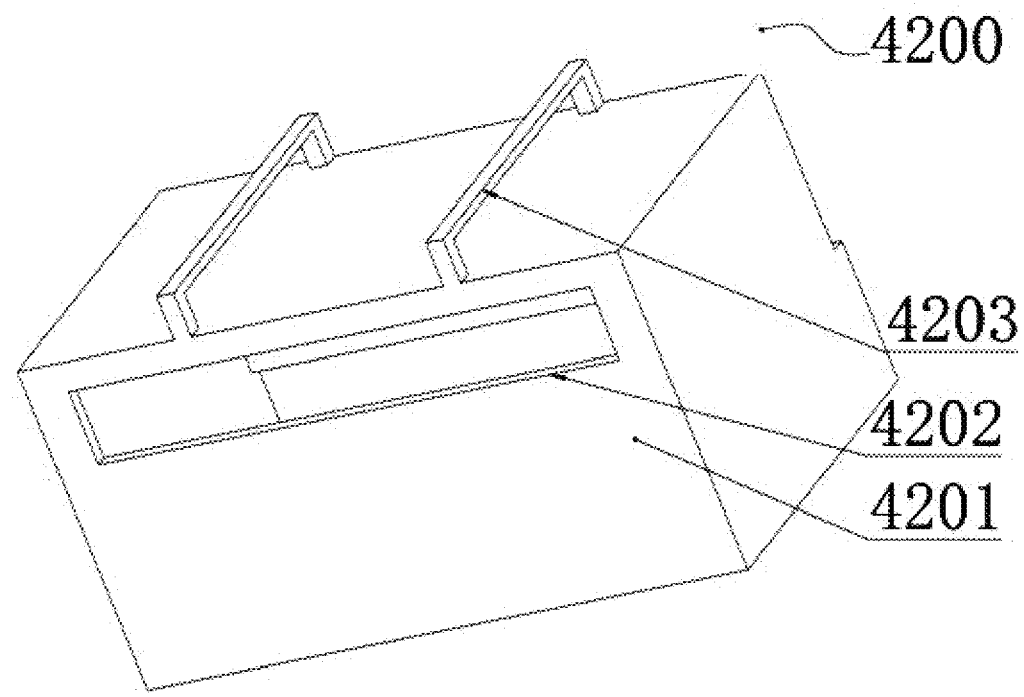
FIG. 19A is a schematic view I of an openable container of the container exchange part.
Figure 19B:
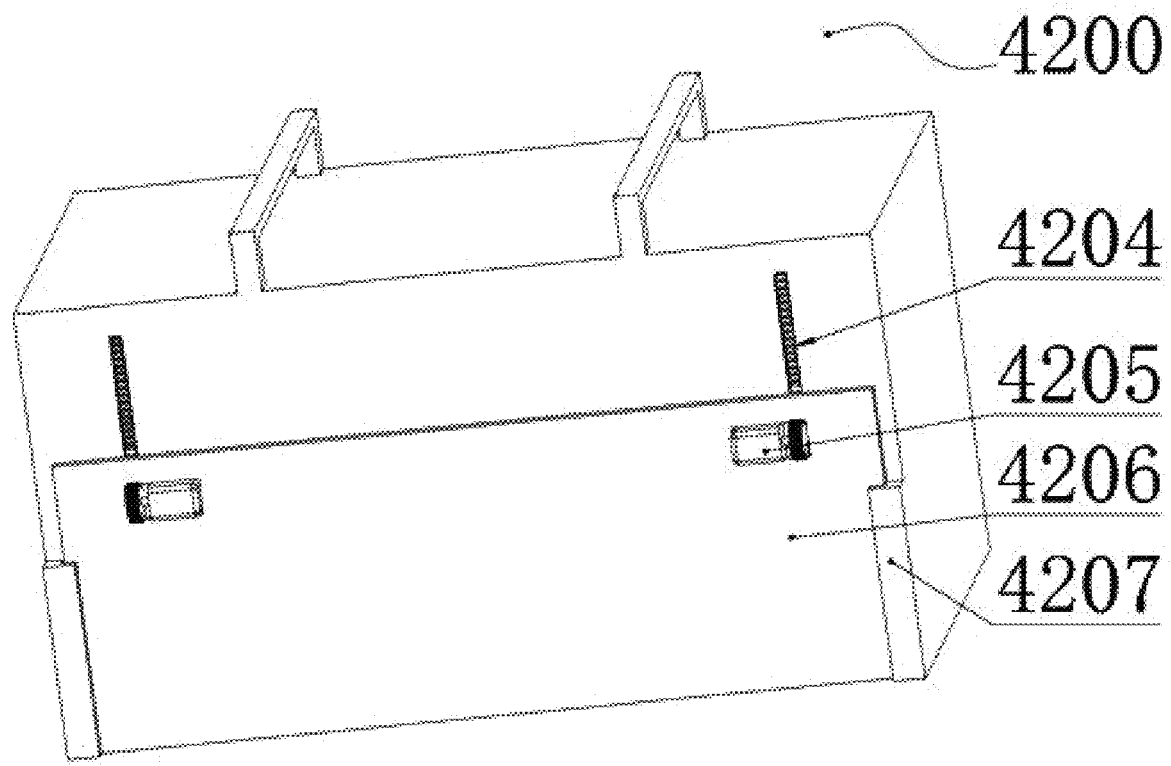
FIG. 19B is a schematic view II of the openable container of the container exchange part.

As shown in FIGS. 19A-19B, a front side of the openable container 4200 sequentially includes an aluminum box 4201, an aluminum box slot 4202 and the aluminum box handles 4203 from bottom to top, and a back side sequentially includes aluminum box gear slots 4204, aluminum box gear motors 4205, an aluminum box baffle 4206 and aluminum box steel angles 4207 from top to bottom. The two aluminum box handles 4203 are welded to the aluminum box 4201 to facilitate gripping of the gripper unit 4100 and insertion of the second openable door 2205, the two aluminum box steel angles 4207 are fixed to the aluminum box 4201, the aluminum box baffle 4206 is movable along slots of the aluminum box steel angles 4207, the aluminum box gear motors 4205 are fixed to slots of the aluminum box baffle 4206, and a gear output shaft of the aluminum box gear motor 4205 meshes with the aluminum box gear slot 4204. The aluminum box gear motors 4205 are started to control the aluminum box baffle 4206 to move up so as to facilitate dumping of the iron pieces or the debris inside the aluminum box.

Figure 20:
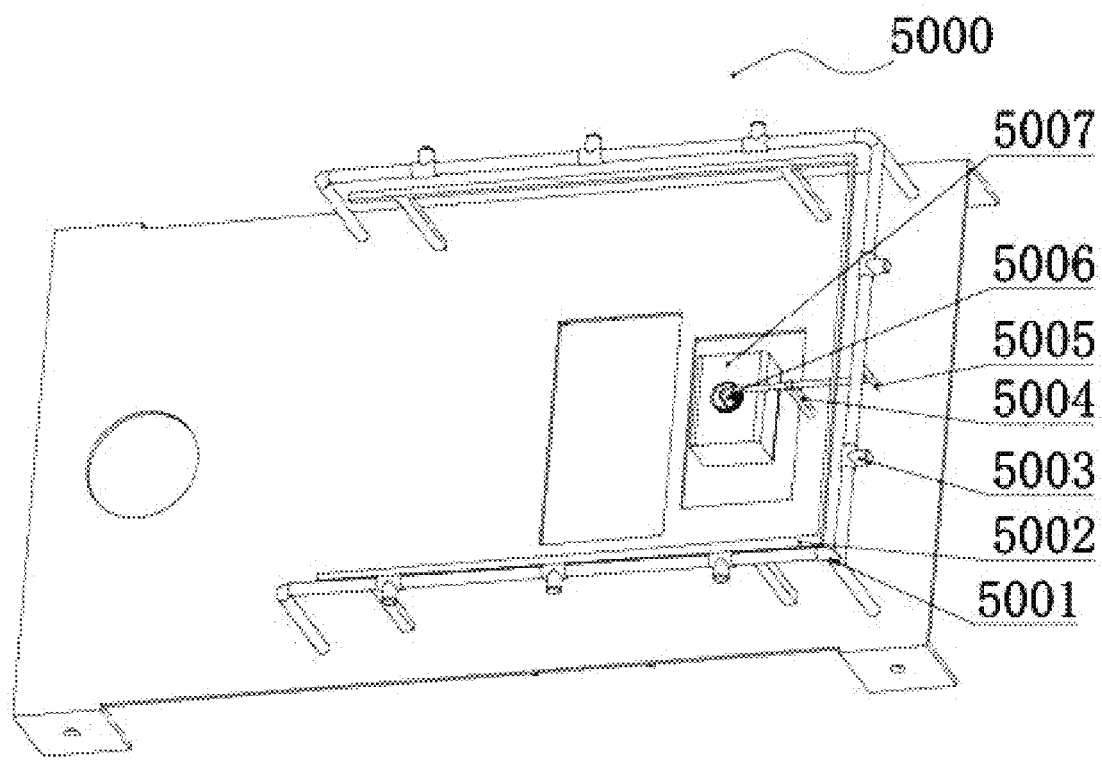
FIG. 20 is a schematic view of a spray part according to the disclosure.

As shown in FIG. 20, the spray part 5000 sequentially includes a first water tube 5001, the water tube holder 5002, nozzles 5003, a water pump holder 5004, a water supply duct 5005, a spray part water pump 5006 and the water tank 5007 from bottom to top. The nozzles 5003 are mounted on the first water tube 5001, the first water tube 5001 is fixed to the water tube holder 5002 through nylon ropes, the water tube holder 5002 is welded to the steel plate 2209, the water supply duct 5005 is connected to the electric diverter valve 6300 through a three-way duct, the water pump holder 5004 is welded to the steel plate 2209 and configured to support the spray part water pump 5006, and the water tank 5007 is arranged on the first openable door 2203. There are two methods to supply water to the water tank. One is to change the water tank through the movable gripper unit 4100 and the multi-openable-door support plate unit 2200, and the other is to supply water from the extensible water pumping unit 6400 through the electric diverter valve 6300. When spraying is needed, the spray part water pump 5006 may be started.

Figure 21:
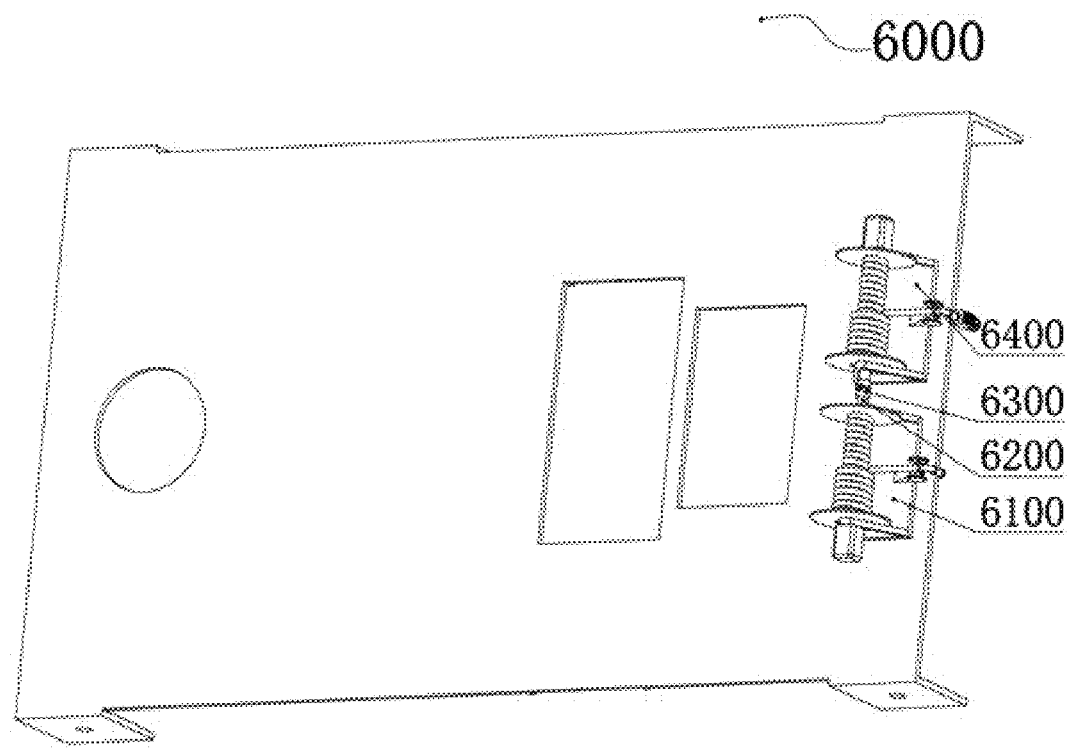
FIG. 21 is a schematic view of a water transfer part according to the disclosure.

As shown in FIG. 21, the water transfer part 6000 includes the extensible water discharging unit 6100, a connecting tube 6200, the electric diverter valve 6300 and the extensible water pumping unit 6400. A first water tube storage rack 6102 in the extensible water discharging unit 6100 and a second water tube storage rack 6402 in the extensible water pumping unit 6400 are welded to the steel plate 2209, the connecting tube 6200 connects a water discharging unit water inlet 6101 to a water pumping unit water outlet 6404, and the electric diverter valve 6300 is connected to the connecting tube 6200. The extensible water discharging unit 6100 is configured to pump accumulated water from an inside to an outside of a building, and the extensible water pumping unit 6400 is configured to pump accumulated water from a bottom of a pit to the ground.

Figure 22:
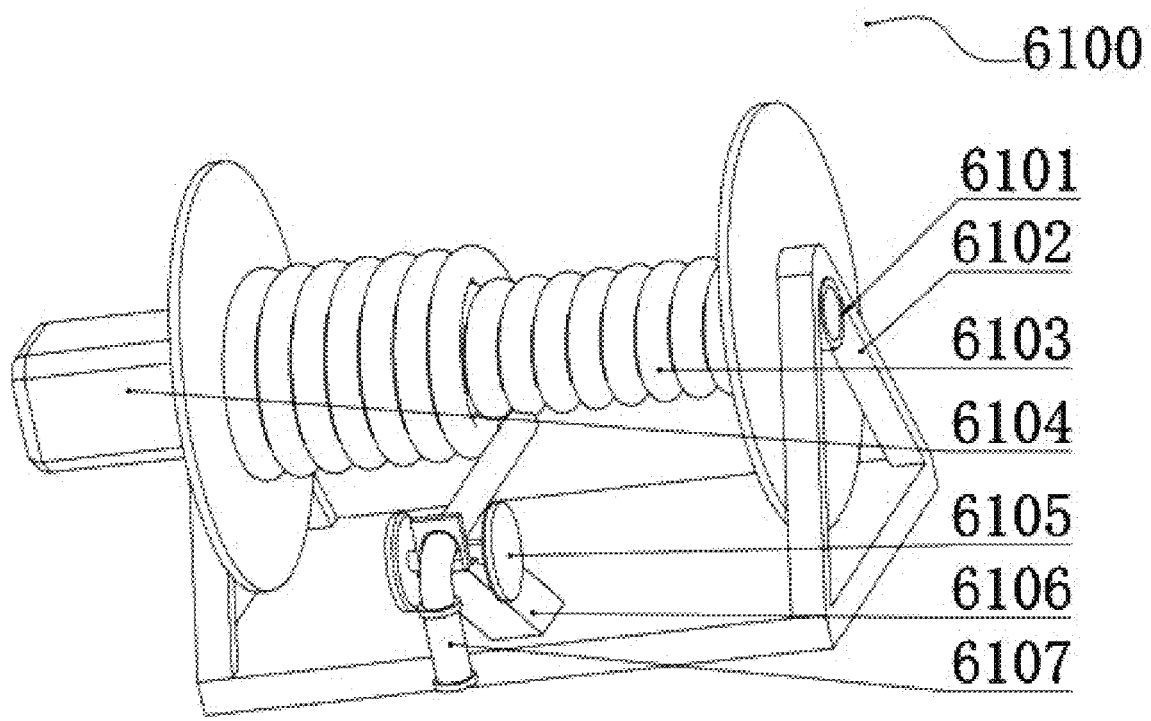
FIG. 22 is a schematic view of an extensible water discharging unit of the water transfer part.

As shown in FIG. 22, the extensible water discharging unit 6100 sequentially includes the water discharging unit water inlet 6101, the first water tube storage rack 6102, a second water tube 6103, a water discharging unit motor 6104, a roller wheel 6105, a roller wheel holder 6106 and a water discharging unit water outlet 6107 from top to bottom. The second water tube 6103 is retractable or extensible along the first water tube storage rack 6102, an output shaft of the water discharging unit motor 6104 is connected to the first water tube storage rack 6102 to control a roller of the first water tube storage rack 6102 to rotate, the roller wheel holder 6106 is welded to the steel plate 2209 and configured to support the roller wheel 6105, and the water discharging unit water outlet 6107 is arranged on the roller wheel 6105 to facilitate extension and retraction of the second water tube 6103. Before pumping water, the cleaning robot is moved to a vicinity of an outdoor drainage ditch, the water discharging unit motor 6104 is started such that the water discharging unit water outlet 6107 is lowered to a side of the drainage ditch, and the second water tube 6103 is extended while moving the robot to a side of the accumulated water in the construction site, thereby completing extension of the extensible water discharging unit 6100.

Figure 23:
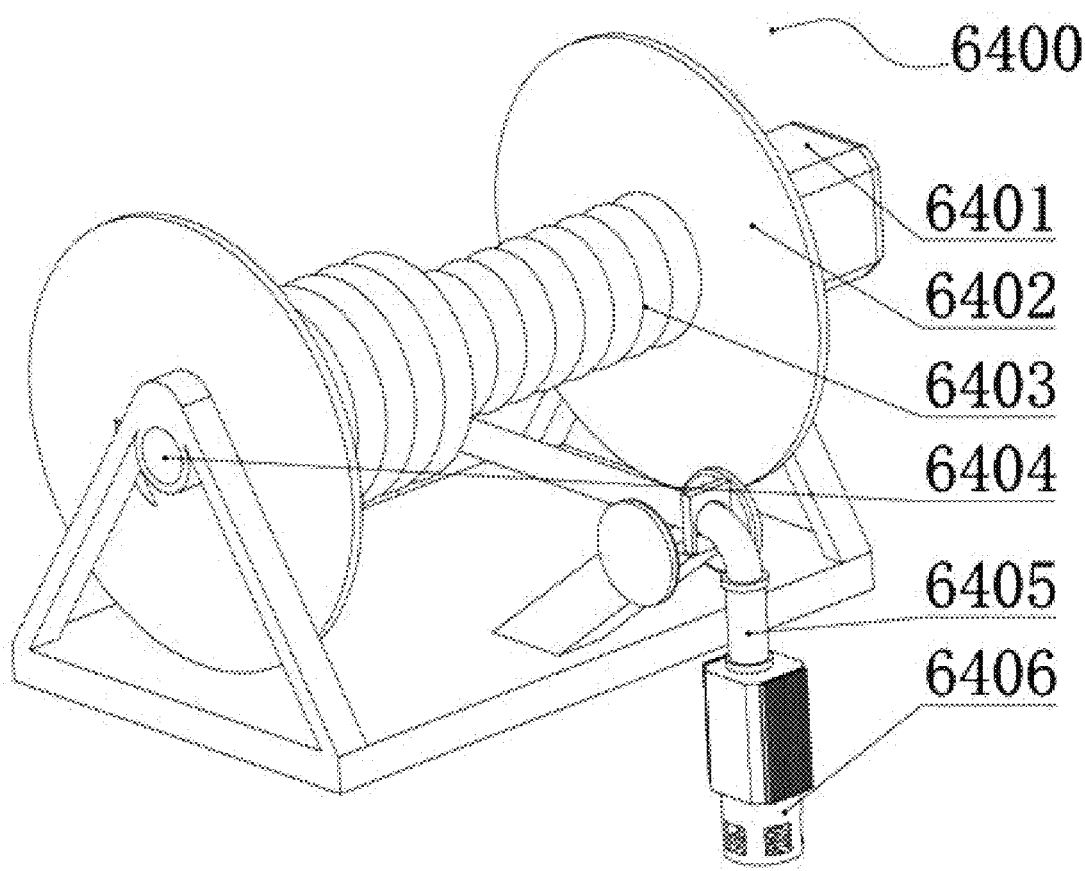
FIG. 23 is a schematic view of an extensible water pumping unit of the water transfer part.

As shown in FIG. 23, the extensible water pumping unit 6400 sequentially includes a water pumping unit motor 6401, the second water tube storage rack 6402, a third water tube 6403, a water pumping unit water outlet 6404, a water pumping unit water inlet 6405 and a water pumping unit water pump 6406 from top to bottom. The second water tube storage rack 6402 in the extensible water pumping unit 6400 has a same composition and a same water tube extension manner as those of the extensible water discharging unit 6100, and the water pumping unit water pump 6406, which is connected to the water pumping unit water inlet 6405, is added to the extensible water pumping unit 6400 based on the extensible water discharging unit 6100. Before pumping water, the third water tube 6403 is extended in a same manner as the extensible water discharging unit 6100 until the water pumping unit water pump 6406 is extended into a bottom of the accumulated water, and the water pumping unit water pump 6406 is started to pump water.

Correspondingly, the cleaning method using the multifunctional construction site cleaning robot provided by the disclosure includes the following steps:

S1: before cleaning away accumulated water, moving the cleaning robot to a vicinity of an outdoor drainage ditch, starting a water discharging unit motor 6104 such that a water discharging unit water outlet 6107 is lowered to a side of the drainage ditch, and extending the second water tube while moving the robot to a side of the accumulated water in a construction site, thereby completing extension of an extensible water discharging unit; and starting a water pumping unit motor 6401 such that a water pumping unit water inlet 6405 is lowered to a bottom of a water pit, and starting a water pumping unit water pump 6406, thereby removing the accumulated water;

S2: before cleaning away weeds/shrubs or slurry agglomerates, moving the robot to above a target object, starting a cutter unit 1500 to cut the target object; when the robot continues moving forward, moving the sweeper unit 1100 to a position where a cutter is originally located, and controlling the sweeper unit 1100 to sweep away debris; and after the dustpan 1105 is full of the debris, dumping the debris into an openable container 4200;

S3: before cleaning away fallen leaves or other light and small debris, replacing all four function units of a bottom rotatable function part 1000 with leaf remover units 1400 to cooperate with mecanum wheels 2101 capable of moving back and forth, moving laterally and moving diagonally, such that the robot is capable of removing the fallen leaves or dust in a large area no matter which direction it goes, where when the robot moves diagonally, the bottom rotatable function part is rotated by 45°, during cleaning, a pulverizing mechanism and a compression mechanism on the robot are capable of pulverizing and compressing the fallen leaves in a debris container 3300 so as to reduce space, and after the cleaning is completed, a hinged door at a bottom of the debris container is opened to dump the debris; and S4: before cleaning away garbage on stairs, starting a three-wheel unit second motor 2104 such that a whole three-wheel unit 2100 rotates to increase a radius of rotation, where during the rotation, when a first mecanum wheel contacts a first step, the first mecanum wheel supports the whole robot to move forward such that a second mecanum wheel contacts a second step, and the process is repeated such that the robot is capable of climbing the stairs; and during stair climbing, the slurry agglomerates are cut by the cutter unit 1500 and then swept away by the sweeper unit 1100, and finally, a spray part 5000 is used to suppress dust.

According to the disclosure, while the water transfer part pumps out the accumulated water, the water may be supplied to the water tank of the spray part. The cleaning robot may be provided with three containers respectively used for storing fallen leaves, slurry agglomerates and recyclable iron pieces. The gripper mechanism arranged on the cleaning robot is convenient for changing the containers and the water tank. While the fallen leaves are collected, the pulverizing unit and the compression unit can pulverize and compress the fallen leaves in the container so as to reduce space. While the cutter cuts the weeds/shrubs or the slurry agglomerates, the sweeper unit 1100 can sweep them away at the same time so as to improve the working efficiency. When the stairs need to be cleaned, the three-link mecanum wheel structures provided in the disclosure can make the cleaning robot climb the stairs. Besides, during the stair climbing process, the cutter unit 1500, the leaf remover unit 1400, the iron remover unit 1200 and the sweeper unit 1100 of the bottom rotatable function part can retract the respective linear actuators so as not to hinder the climbing of the robot. Moreover, during the climbing process, slurry agglomerates, iron pieces and dust on the stairs can be removed.

The foregoing descriptions are merely specific embodiments in the disclosure, but the scope of protection of the disclosure is not limited thereto. Any changes or substitutions that can be figured out by those skilled in the art within the technical scope disclosed by the disclosure shall fall into the scope of the disclosure.

What is claimed is:

1. A multifunctional construction site cleaning robot, comprising:
    a chassis part, comprising a multi-openable-door support plate unit that supports multiple doors and three-wheel units mounted at four corners of the multi-openable-door support plate unit, and configured to drive the whole robot to move on ground and climb stairs;
    a bottom rotatable function part, mounted at a middle position of a bottom of the multi-openable-door support plate unit, and comprising a rotatable cross bracket unit, and a sweeper unit, an iron remover unit, a leaf remover unit and a cutter unit that are detachably mounted on the rotatable cross bracket unit, the cutter unit and the sweeper unit are configured to be used in combination for cutting and cleaning away cement agglomerates or weeds/shrubs, the iron remover unit is configured to remove recyclable iron pieces on a construction site, and the leaf remover unit is configured to remove light and small debris on the construction site;
    a debris treatment part, mounted on one side of the multi-openable-door support plate unit and connected to the leaf remover unit, and comprising a compression unit, a debris container and a pulverizing unit, the pulverizing unit and the compression unit are configured to be used in combination for pulverizing and compacting debris in the debris container;
    a container exchange part, mounted on the multi-openable-door support plate unit and comprising a movable gripper unit and two openable containers, the movable gripper unit is configured to exchange positions of the two openable containers, and the openable containers are configured to contain sundries collected by the sweeper unit and the iron remover unit;
    a spray part, mounted on the other side of the multi-openable-door support plate unit and configured to prewet or dedust the construction site; and
    a water transfer part, mounted on an edge of the multi-openable-door support plate unit close to the spray part and comprising an extensible water discharging unit and an extensible water pumping unit, the extensible water discharging unit is configured to pump accumulated water from an inside to an outside of a building, and the extensible water pumping unit is being configured to pump the accumulated water from a bottom of a pit to the ground; wherein the multi-openable-door support plate unit comprises first gear slots, first gear motors, a first openable door, first steel angles, two openable doors, second gear slots, second gear motors, four second steel angles, a steel plate, a circular opening and four perforated steel plates; wherein the two first steel angles are welded on two sides of a water tank slot of the steel plate, the first openable door is movable along grooves formed by the first steel angles, the two first gear motors are fixed to two slots on the first openable door, and a gear output shaft of the first gear motor meshes with the first gear slot;

the four second steel angles are fixed on two sides of container slots with two on each side of the container slots, a second of the two openable doors is movable along grooves formed by the second steel angles, the second gear motor is fixed to the second of the two openable doors, a gear output shaft of the second gear motor meshes with the second gear slot, and the four perforated steel plates are respectively fixed to four corners of the steel plate;

the three-wheel units each comprise mecanum wheels, three-wheel unit first motors, a three-shaft link and a three-wheel unit second motor, the three three-wheel unit first motors are fixed to three corners of the three-shaft link, the three mecanum wheels are respectively connected to output shafts of the three-wheel unit first motors, the three-wheel unit second motor is fixed to the perforated steel plate, and an output shaft of the three-wheel unit second motor is connected to a center of the three-shaft link;

when the cleaning robot travels on a flat surface, two of the mecanum wheels are on the ground, and by controlling speeds of the three-wheel unit first motors of the two mecanum wheels on the ground, the cleaning robot is capable of moving back and forth, moving laterally, moving diagonally and rotating in place;

a front wall of a box shaped container of the openable container sequentially comprises an aluminum box, an aluminum box slot and aluminum box handles from bottom to top, and a back side sequentially comprises aluminum box gear slots, aluminum box gear motors, an aluminum box baffle and aluminum box steel angles from top to bottom; the two aluminum box handles are welded to the aluminum box to facilitate gripping by the gripper unit, the two aluminum box steel angles are fixed to the aluminum box, the aluminum box baffle is movable along slots of the aluminum box steel angles, the aluminum box gear motors are fixed to slots of the aluminum box baffle, and a gear output shaft of the aluminum box gear motor meshes with the aluminum box gear slot; and the aluminum box gear motors are configured to control the aluminum box baffle to move up or down.

2. The multifunctional construction site cleaning robot according to claim 1, wherein the sweeper unit comprises a broom mechanism and a dustpan mechanism, and the dustpan mechanism sequentially comprises a sweeper support plate, a sweeper first u-shaped steel, sweeper first steering motors, sweeper first linear actuators, a dustpan and a sweeper first motor from top to bottom;

the broom mechanism sequentially comprises a sweeper second u-shaped steel, sweeper second steering motors, sweeper second linear actuators, a roller broom and a sweeper second motor from top to bottom; the roller broom is formed by a roller and four metal sheets uniformly distributed on a circumferential surface of the roller;

the sweeper support plate is fixed to a cross iron bracket of the rotatable cross bracket unit by nuts and bolts, the sweeper first u-shaped steel is welded to the sweeper support plate, the sweeper first steering motors are fixed to the sweeper first u-shaped steel, the sweeper first linear actuator is connected to an output shaft of the sweeper first steering motors, and an output shaft of the sweeper first motor runs through an output shaft of the sweeper first linear actuator and is connected to the dustpan; and the sweeper second u-shaped steel is fixed to the sweeper support plate, the sweeper second steering motors are fixed to the sweeper second u-shaped steel, the sweeper second linear actuator is connected to an output shaft of the sweeper second steering motors, and an output shaft of the sweeper second motor runs through an output shaft of the sweeper second linear actuator and is connected to the roller broom.

3. The multifunctional construction site cleaning robot according to claim 2, wherein the iron remover unit sequentially comprises an iron remover support plate, an iron remover u-shaped steel, iron remover steering motors, iron remover linear actuators, an iron remover motor and an electromagnetic roller from top to bottom, the iron remover support plate is fixed to the cross iron bracket by nuts and bolts, the iron remover u-shaped steel is fixed to the iron remover support plate, the iron remover steering motors are fixed to the iron remover u-shaped steel, the iron remover linear actuator is connected to an output shaft of the iron remover steering motors, and an output shaft of the iron remover motor runs through an output shaft of the iron remover linear actuator and is connected to the electromagnetic roller; wherein the iron remover linear actuators are configured to adjust a height of the electromagnetic roller, the electromagnetic roller is configured to create a magnetic field, and the iron remover motor is configured to control the electromagnetic roller to rotate the iron remover steering motors are configured to control the electromagnetic roller to move to the aluminum box slot in the openable container; and when the electromagnetic roller is completely extended into the slot, the electromagnetic roller is configured to be powered off to remove magnetic properties, and the iron pieces naturally fall into the container.

4. The multifunctional construction site cleaning robot according to claim 3, wherein the leaf remover unit sequentially comprises a leaf remover support plate, a leaf remover first linear actuator, a leaf remover u-shaped steel, a conduit, leaf remover second linear actuators, a round rod and a suction nozzle from top to bottom; the leaf remover support plate is fixed to the cross iron bracket by nuts and bolts, the leaf remover u-shaped steel and the leaf remover first linear actuator are fixed to the leaf remover support plate, leaf remover steering motors are fixed to the leaf remover u-shaped steel, the leaf remover second linear actuator is connected to an output shaft of the leaf remover steering motor, and output shafts of the leaf remover second linear actuators are connected to the suction nozzle through the round rod;

an inlet at a lower end of the conduit is connected to the suction nozzle, an upper end of the conduit is fixed to an output shaft of the leaf remover first linear actuator; wherein, a turntable motor is configured to rotate to control a direction that the leaf remover unit faces, the leaf remover first linear actuator is configured to extend and retract to control movement of the conduit, the fan is configured to create suction, and the whole cleaning robot is configured to move to remove the light and small debris on the construction site.

5. The multifunctional construction site cleaning robot according to claim 4,
wherein the cutter unit sequentially comprises a cutter, a cutter first steering motor, a cutter first link, a cutter second steering motor, a cutter second link, a cutter third steering motor, a steering motor turntable, a cutter fourth steering motor, a steering motor fixing plate and a cutter support plate from top to bottom; the cutter support plate is fixed to the cross iron bracket by nuts and bolts, the steering motor fixing plate fixes the cutter fourth steering motor to the cutter support plate, the steering motor turntable is connected to an output shaft of the cutter fourth steering motor, the cutter third steering motor is fixed to the steering motor turntable, one end of the cutter second link is connected to an output shaft of the cutter third steering motor, the other end is connected to the cutter second steering motor, the cutter second steering motor and the cutter first steering motor are respectively fixed to two ends of the cutter first link, and the cutter is connected to an output shaft of the cutter first steering motor; and
the cutter second steering motor and the cutter third steering motor adjust a height of the cutter by adjusting angles of the cutter first link and the cutter second link relative to the cutter support plate, the cutter fourth steering motor is capable of controlling the cutter to move left and right, and the cutter first steering motor is capable of controlling a cutting direction of the cutter.

6. The multifunctional construction site cleaning robot according to claim 5, wherein the compression unit comprises traveling mechanisms on two sides and a compression mechanism located in a middle of the two traveling mechanisms, and the traveling mechanisms each sequentially comprise a compression unit u-shaped strut, a compression unit motor, a first perforated caster, a compression unit linear actuator and a second perforated caster; the compression mechanism sequentially comprises a compression unit first round rod, a compression unit hydraulic cylinder, a compression unit second round rod, compression unit first links and a circular plate from top to bottom;
an output shaft of the compression unit motor runs through the compression unit u-shaped strut and is connected to the first perforated caster, the compression unit linear actuator is fixed to a side surface of the compression unit u-shaped strut, the compression unit first round rod is fixed in a middle of the two compression unit u-shaped struts, a cylinder body of the compression unit hydraulic cylinder is fixed to the compression unit first round rod, a cylinder plunger is connected to the compression unit second round rod, and two ends of the compression unit second round rod are connected to the circular plate through the two compression unit first links;
the compression unit motors are configured to control the compression unit to move until the circular plate is coaxial with a drum of the debris container, the compression unit linear actuators having output shafts that are configured to be extended into small holes of the second perforated casters to prevent the compression unit from slipping during use of the compression mechanism, and the compression unit hydraulic cylinder is configured to control the circular plate to apply a pressure to the debris in the debris container, so as to compress the debris;
the debris container comprises the drum, a circular hinged door, debris container links, a bidirectional linear actuator and the fan, the fan is connected to a slot on a side surface of the drum, two ends of a middle rod in the circular hinged door are fixed to a bottom of the drum, and the bidirectional linear actuator is fixed to the circular hinged door through the two debris container links; and the bidirectional linear actuator is capable of opening the circular hinged door by retracting an output shaft so as to facilitate dumping of the debris in the debris container;
the pulverizing unit comprises traveling mechanisms on two sides and a pulverizing mechanism located in a middle of the two traveling mechanisms; the pulverizing mechanism sequentially comprises a pulverizing unit link, a pulverizing unit hydraulic cylinder, a pulverizing unit motor and a blade holder from top to bottom; two ends of the pulverizing unit link are fixed to pulverizing unit u-shaped struts on two sides, a cylinder body of the pulverizing unit hydraulic cylinder is connected to the pulverizing unit link, a cylinder plunger is connected to the pulverizing unit motor, and the blade holder is fixed to an output shaft of the pulverizing unit motor; and
and after the blade holder is aligned with the drum, the pulverizing unit motor is configured to make blades on the blade holder rotate, and the pulverizing unit hydraulic cylinder is configured to extend the blade holder into the drum to pulverize the debris.

7. The multifunctional construction site cleaning robot according to claim 6, wherein the movable gripper unit comprises traveling devices on two sides and a gripper mechanism located in a middle of the two traveling devices, wherein the traveling device sequentially comprises a second steel channel, a gripper unit u-shaped strut, a gripper unit hydraulic cylinder and a gripper first support plate from bottom to top; the gripper mechanism sequentially comprises gripper second support plates, a gripper third support plate, gripper first links, gripper second links and joints from top to bottom;
a cylinder body of the gripper unit hydraulic cylinder is fixed to the gripper unit u-shaped strut, a cylinder plunger is connected to the gripper first support plate, the two gripper second support plates are fixed to the gripper first support plate, the gripper third support plate is fixed to the gripper second support plates so as to support a gripper hydraulic cylinder, and the gripper hydraulic cylinder is fixed to the gripper third support plate; one end of the gripper first link is connected to the gripper second support plate, and the other end is connected to the joint; and one end of the gripper second link is connected to a cylinder plunger of the gripper hydraulic cylinder, and the other end is connected to the joint.

8. The multifunctional construction site cleaning robot according to claim 7, wherein the extensible water discharging unit comprises a water discharging unit water inlet, a first water tube storage rack, a second water tube, a water discharging unit motor, a roller wheel, a roller wheel holder and a water discharging unit water outlet; the second water tube is retractable or extensible along the first water tube storage rack, an output shaft of the water discharging unit motor is connected to the first water tube storage rack to control a roller of the first water tube storage rack to rotate, the roller wheel holder is welded to the steel plate and configured to support the roller wheel, and the water discharging unit water outlet is arranged on the roller wheel;

the cleaning robot is configured to be moved to a vicinity of an outdoor drainage ditch, the water discharging unit motor is configured to lower the water discharging unit water outlet to a side of the drainage ditch, and the second water tube is configured to extend while moving the robot to a side of the accumulated water in the construction site, thereby completing extension of the extensible water discharging unit;

the extensible water pumping unit comprises a water pumping unit motor, a second water tube storage rack, a third water tube, a water pumping unit water outlet, a water pumping unit water inlet and a water pumping unit water pump; and the third water tube is configured to extend until the water pumping unit water pump is extended into a bottom of the accumulated water, and the water pumping unit water pump is configured to pump the water.

9. A cleaning method using a multifunctional construction site cleaning robot, comprising the following steps:

S1: provide the multifunctional construction site cleaning robot of claim 8;

S2: before cleaning away the accumulated water, moving the cleaning robot to the vicinity of the outdoor drainage ditch, starting the water discharging unit motor such that the water discharging unit water outlet is lowered to the side of the drainage ditch, and extending the second water tube while moving the robot to the side of the accumulated water in the construction site, thereby completing the extension of the extensible water discharging unit; and starting the water pumping unit motor such that the water pumping unit water inlet is lowered to a bottom of a water pit, and starting the water pumping unit water pump, thereby removing the accumulated water;

S3: before cleaning away the weeds/shrubs or slurry agglomerates, moving the robot to above a target object, starting the cutter unit to cut the target object; when the robot continues moving forward, moving the sweeper unit to a position where the cutter is originally located, and controlling the sweeper unit to sweep away the debris; and after the dustpan is full of the debris, dumping the debris into the openable container;

S4: before cleaning away fallen leaves or other light and small debris, replacing a function unit of the bottom rotatable function part with the leaf remover unit to cooperate with the mecanum wheels capable of moving back and forth, moving laterally and moving diagonally, such that the robot is capable of removing the fallen leaves or dust in a large area no matter which direction it goes, wherein when the robot moves diagonally, the bottom rotatable function part is rotated by 45°, during cleaning, the pulverizing mechanism and the compression mechanism on the robot are capable of pulverizing and compressing the fallen leaves in the debris container so as to reduce the space, and after the cleaning is completed, a hinged door at a bottom of the debris container is opened to dump the debris; and S5: before cleaning away garbage on the stairs, starting the three-wheel unit second motor such that the whole three-wheel unit rotates to increase a radius of rotation, wherein during the rotation, when a first mecanum wheel contacts a first step, the first mecanum wheel supports the whole robot to move forward such that a second mecanum wheel contacts a second step, and a process is repeated such that the robot is capable of climbing the stairs; and during stair climbing, the slurry agglomerates are cut by the cutter unit and then swept away by the sweeper unit, and finally, the spray part is used to suppress the dust.

\* \* \* \* \*